United States Patent [19]
Pickrell

[11] Patent Number: 5,664,765
[45] Date of Patent: Sep. 9, 1997

[54] APPARATUS AND METHOD FOR PULLING CABLE

[75] Inventor: John W. Pickrell, Scottsdale, Ariz.

[73] Assignee: JP Patent Holdings LLC, Scottsdale, Ariz.

[21] Appl. No.: 634,568

[22] Filed: Apr. 18, 1996

Related U.S. Application Data

[60] Division of Ser. No. 238,327, May 5, 1994, Pat. No. 5,533,711, which is a continuation-in-part of Ser. No. 853,514, Mar. 18, 1992, Pat. No. 5,324,006, which is a division of Ser. No. 532,793, Jun. 4, 1990, Pat. No. 5,152,506.

[51] Int. Cl.$^6$ ............................ H02G 1/08; B66D 1/00
[52] U.S. Cl. ............................ 254/271; 226/42; 226/44; 254/272; 254/361; 254/134.3 R
[58] Field of Search ............................ 254/134.3 FT, 254/134.3 R, 134.4, 271, 272, 273, 277, 361; 242/47.01, 47.09, 47.08; 226/45, 44, 42

[56] References Cited

U.S. PATENT DOCUMENTS

| | | | |
|---|---|---|---|
| 3,201,090 | 8/1965 | Jones | 254/134.3 FT |
| 4,458,880 | 7/1984 | Conti | 254/134.3 FT |
| 4,609,181 | 9/1986 | Fisher et al. | 254/134.3 FT |
| 4,669,705 | 6/1987 | Langston | 254/134.3 FT |
| 4,876,661 | 10/1989 | Langston | 254/134.3 FT |
| 4,899,988 | 2/1990 | Mills | 254/134.3 R |
| 5,029,816 | 7/1991 | Langston | 254/134.3 FT |
| 5,152,506 | 10/1992 | Pickrell | 254/134.4 FT |
| 5,324,006 | 6/1994 | Pickrell | 254/134.3 FT |

*Primary Examiner*—Katherine Matecki
*Attorney, Agent, or Firm*—Parsons & Goltry; Robert A. Parsons; Michael W. Goltry

[57] ABSTRACT

A primary device placed at the upstream end of a duct and a relay device placed at an access point pull a cable through respective duct segments. The pulling speed of the primary device is controlled by an operator. The pulling speed of the relay device is variable in response to movement of the cable by the primary device to maintain equilibrium between the pulling speeds of the devices. The pulling tension exerted upon the cable by each device is monitored and discontinued upon reaching a predetermined maximum value. At the inlet to the second segment, lubricant is supplied to the cable at a quantitative rate which is proportional to the pulling speed.

9 Claims, 9 Drawing Sheets

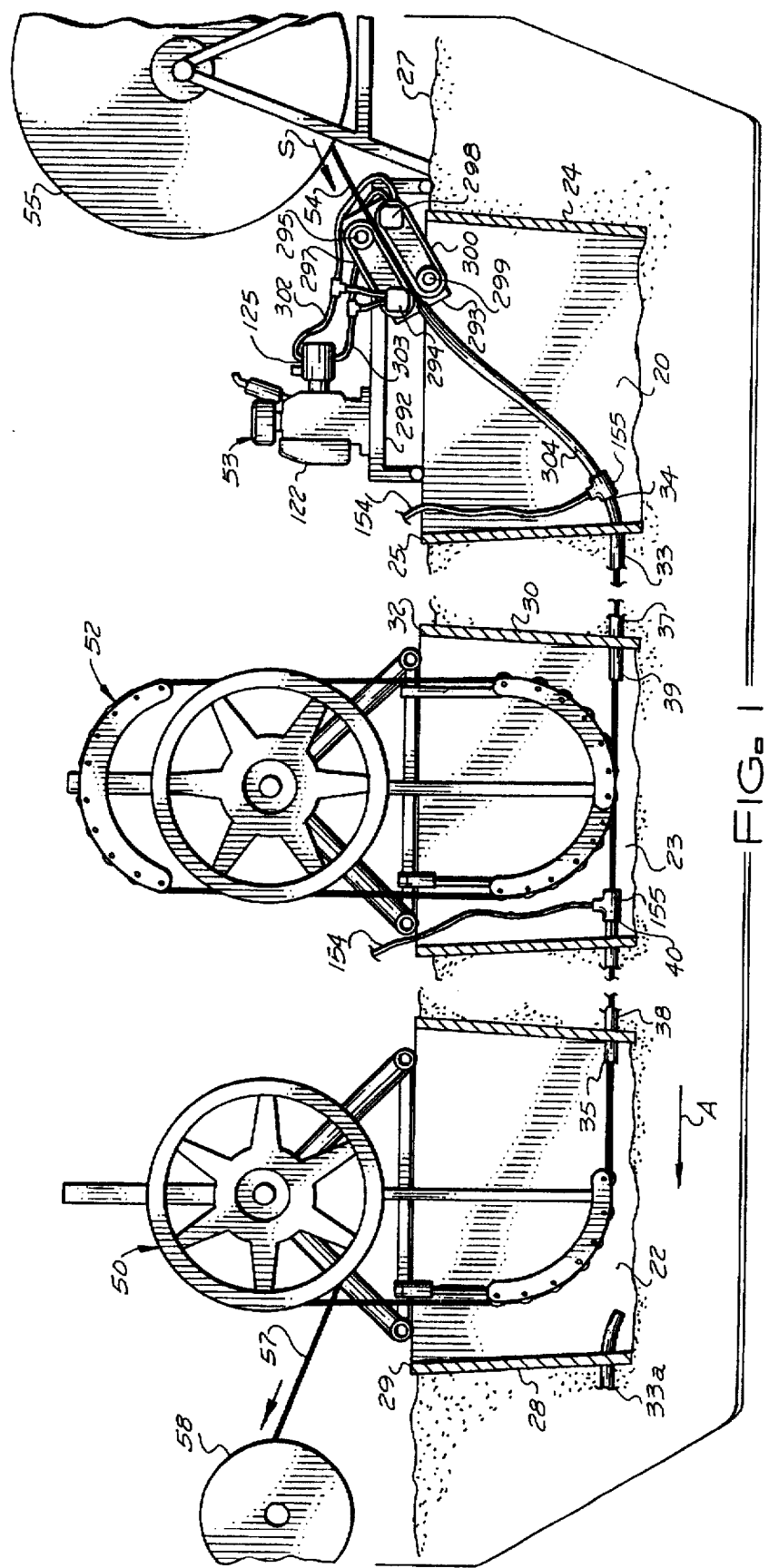

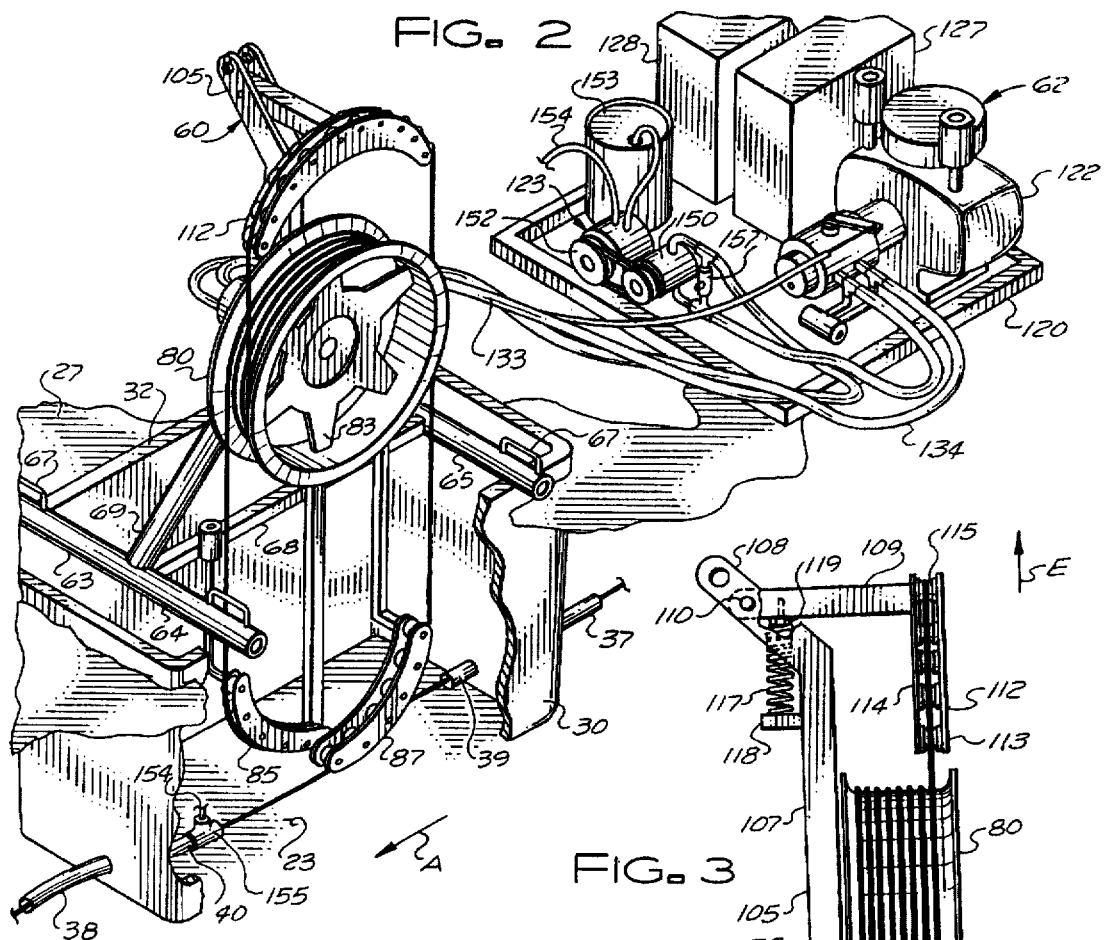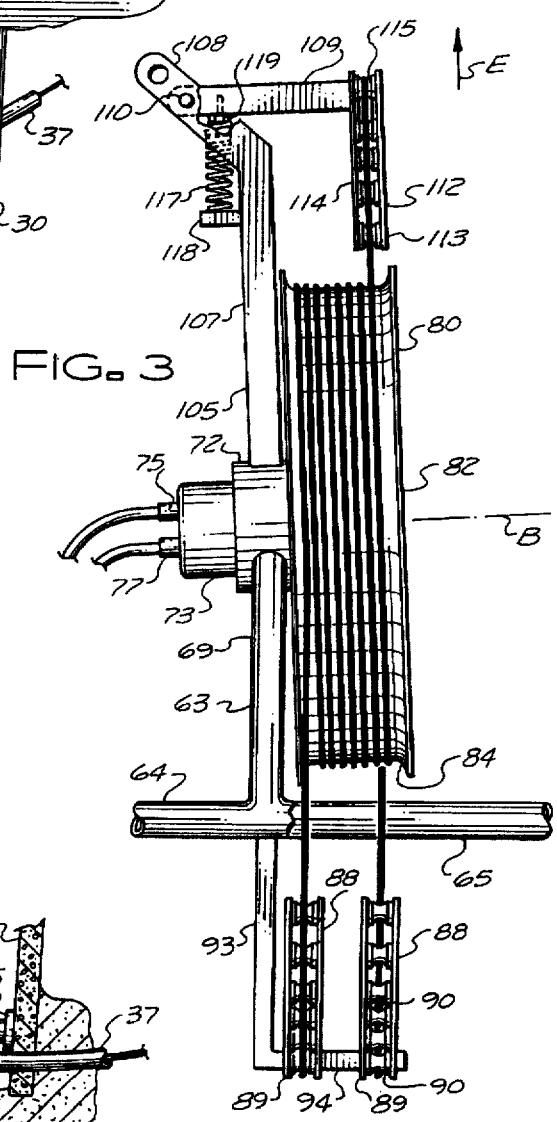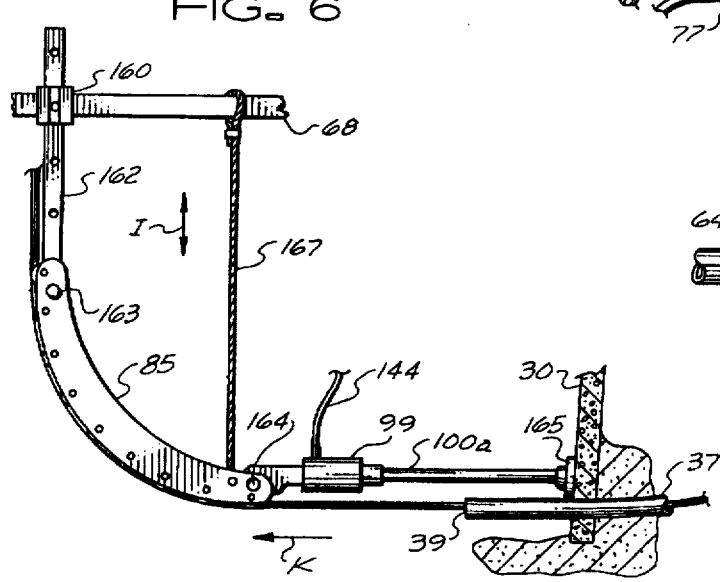

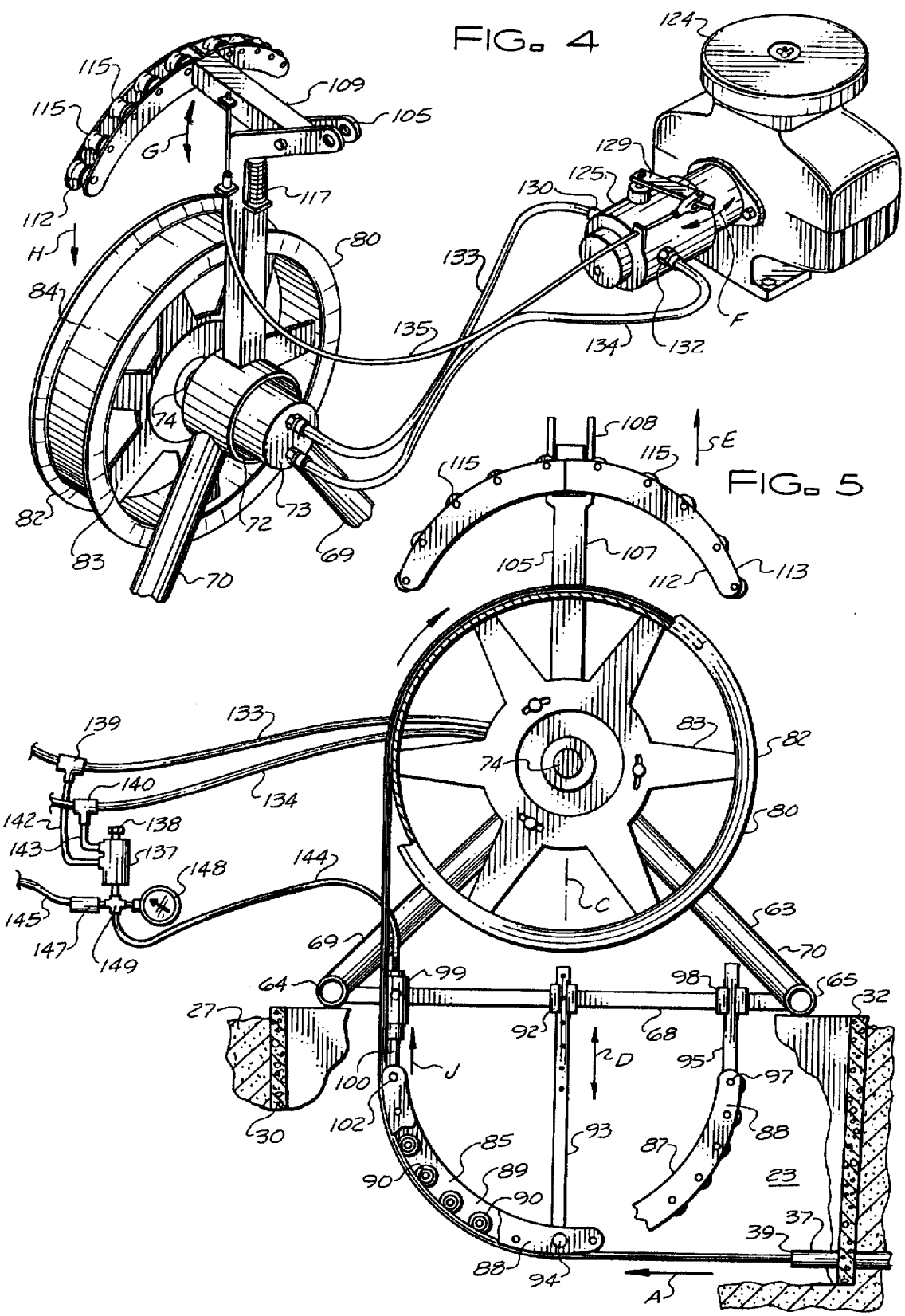

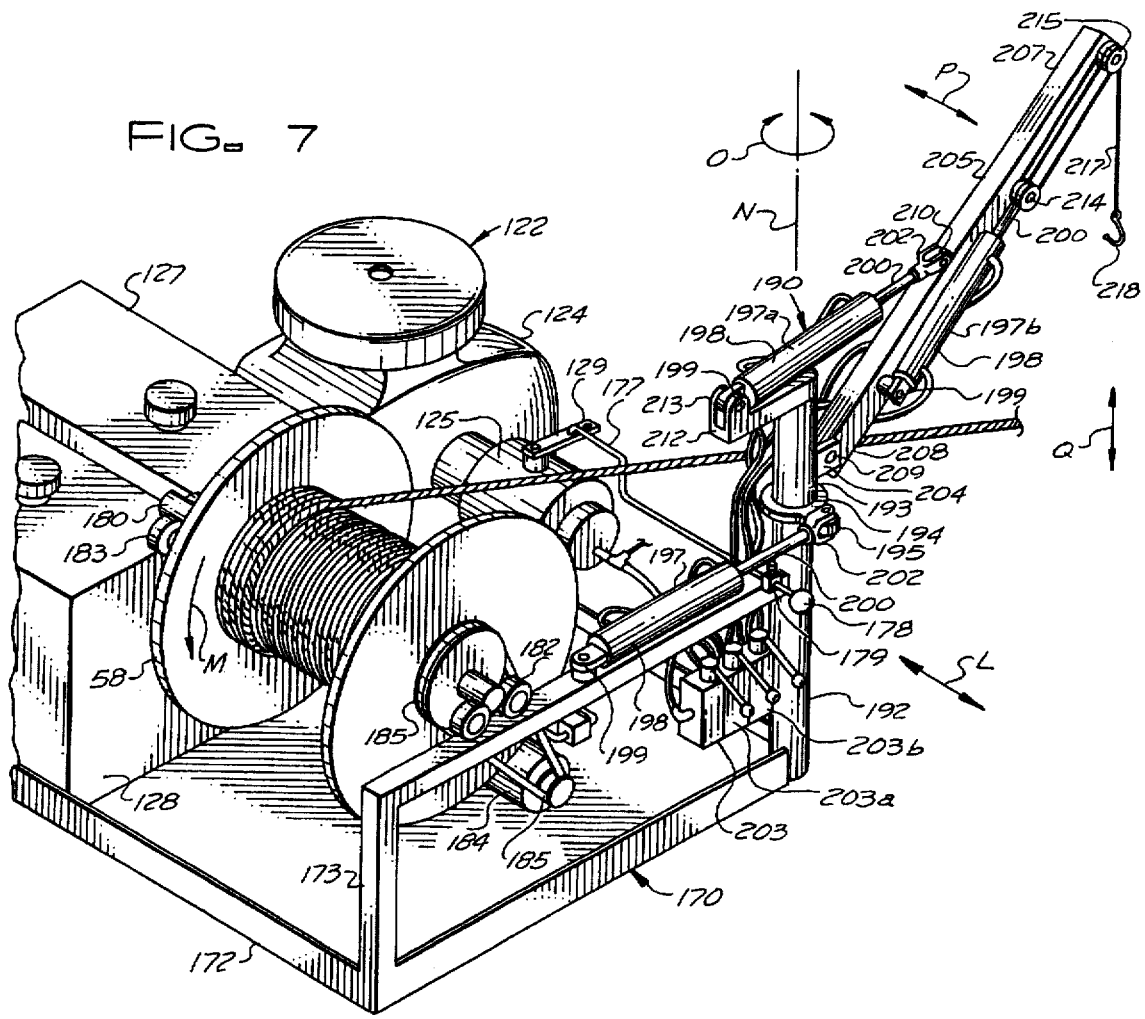
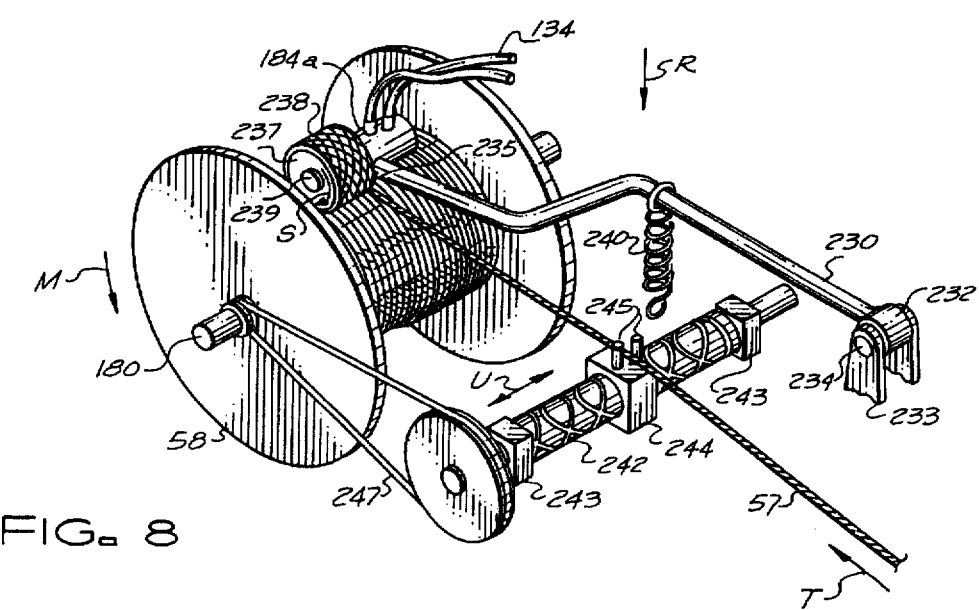

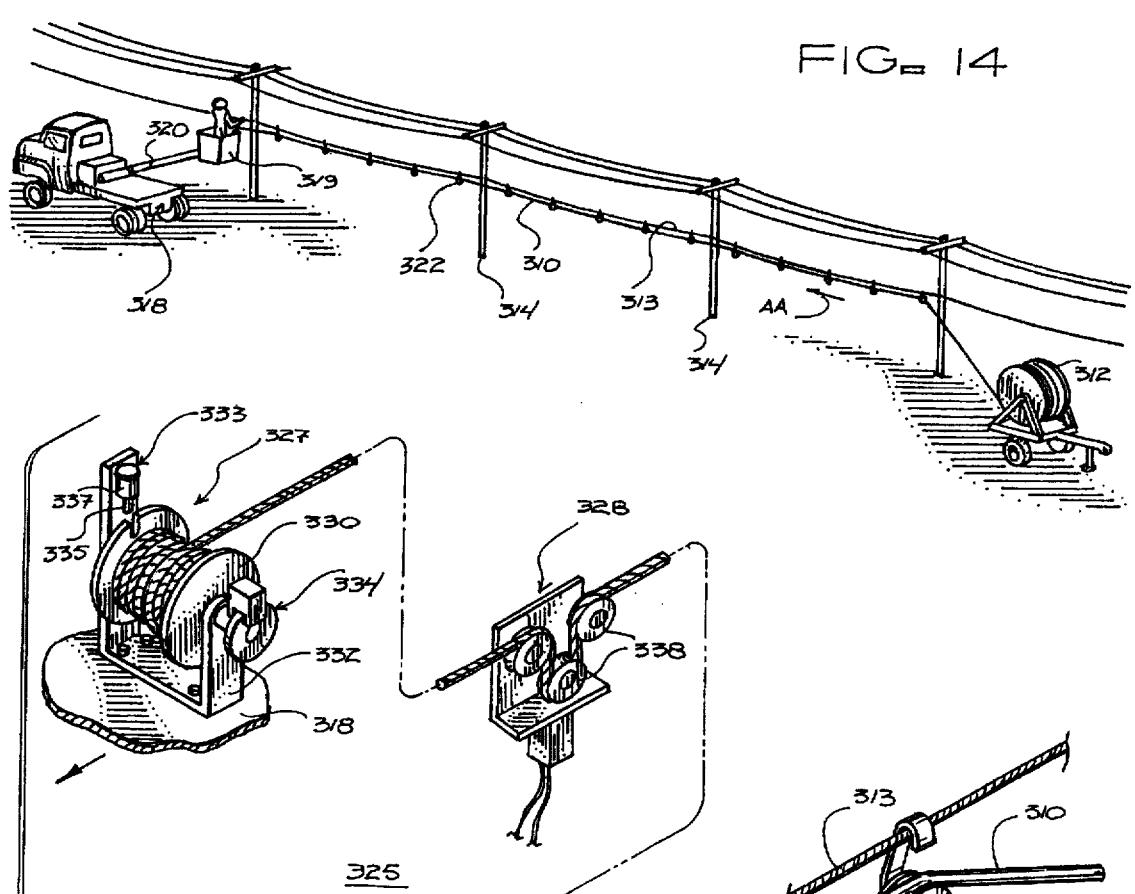

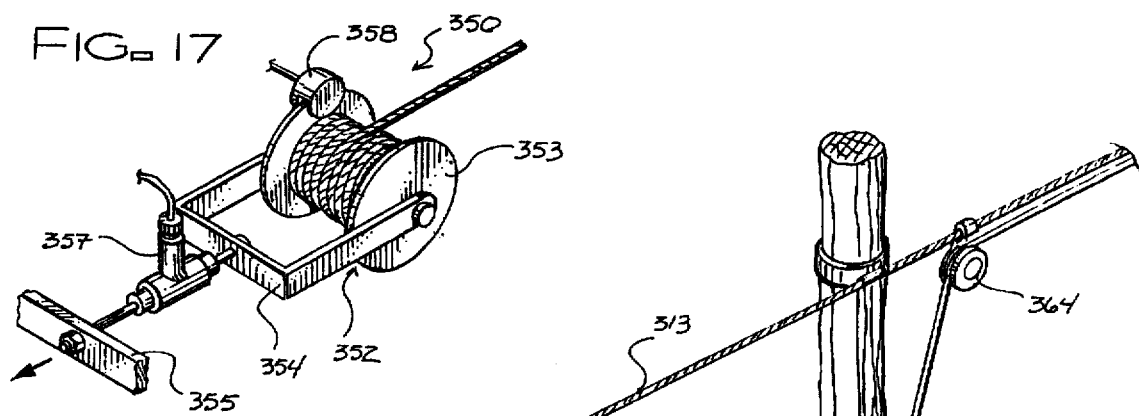
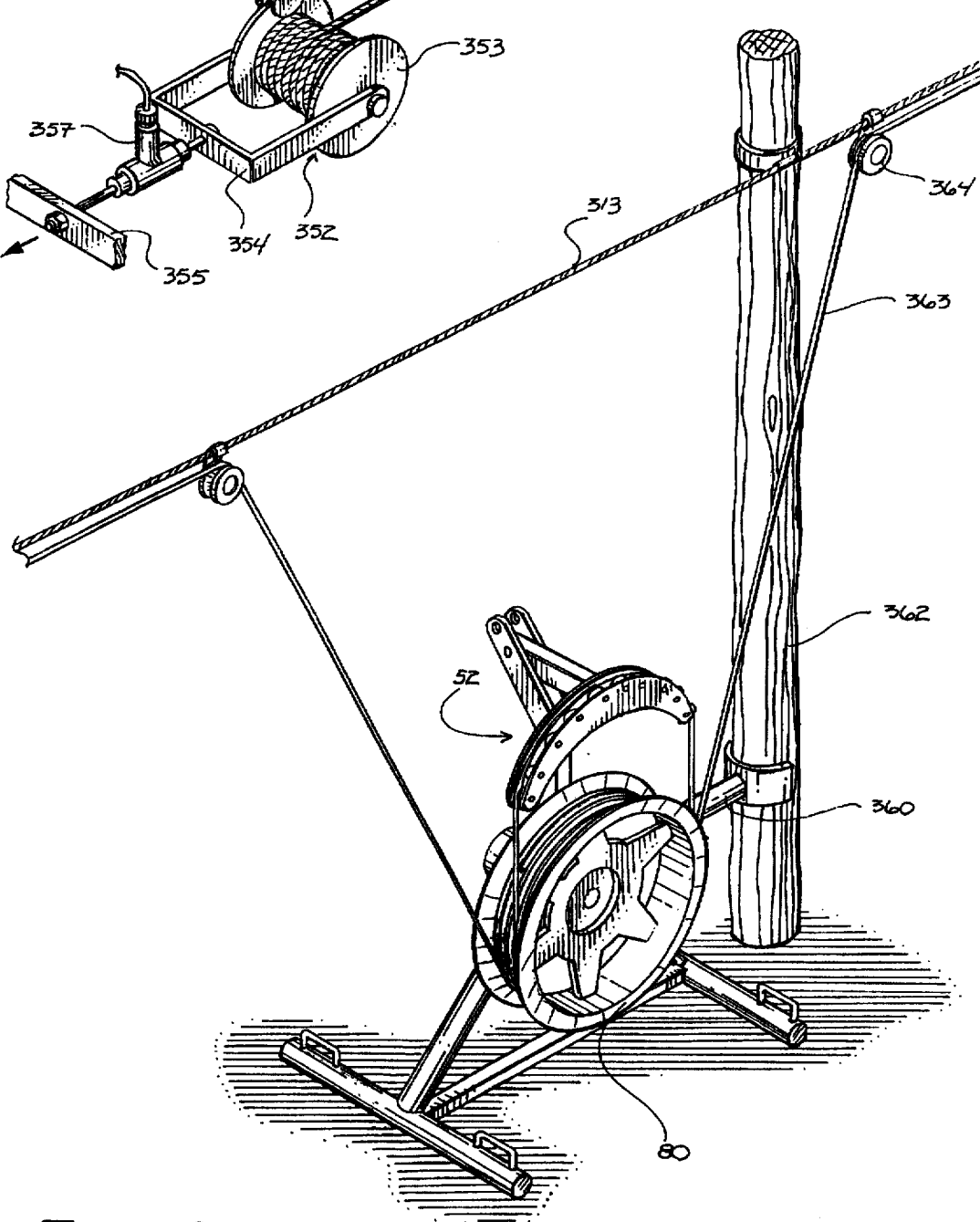

APPARATUS AND METHOD FOR PULLING CABLE

CROSS REFERENCE TO RELATED APPLICATIONS

The instant application is a division of application Ser. No. 08/238,327, filed May 5, 1994 now issued as U.S. Pat. No. 5,533,711, which is a continuation-in-part of application Ser. No. 07/853,514, filed Mar. 18, 1992, now issued as U.S. Pat. No. 5,324,006, which is a division of application Ser. No. 07/532,793, filed Jun. 4, 1990, now issued as U.S. Pat. No. 5,152,506.

BACKGROUND OF THE INVENTION

1. Field of the Invention

This invention relates to the installation of signal transmission cable.

More particularly, the present invention relates to method and apparatus of the type especially adapted for pulling an extended length of fiber optic cable through a subterranean duct.

In a further and more specific aspect, the instant invention concerns improvements in methods and apparatus according to the foregoing for monitoring and sensing selected characteristics of the cable during pulling and modulating the pulling accordingly.

2. Prior Art

Various types of cable especially adapted for the transmission of audio and visual signals are well known. Conventional cable, for example, incorporates metallic wire as the medium for transmission of signals in the form of electric current. More recently, the art has directed attention to fiber optic cable in which encoded light pulses are transmitted through thin fibers of glass, plastic or other transparent material.

Signal transmission cables are subject to varying installation schemes. Especially common are airborne installations and underground installations. In an airborne scheme, the cable is suspended between supporting members such as poles. In an underground system, the cable is buried. Certain types of cable are suitable for direct installation. Others require a protective encasement.

In an underground or subterranean system it is generally preferred that the cable resides within a conduit commonly termed a subduct. The subduct provides protection for the more fragile types of cable. The subduct also facilitates maintenance of the cable and may accommodate subsequent installation of additional cable.

Typically, a subterranean system includes a subduct of extended length, frequently many miles, which has been buried by conventional practice such as plowing, trenching and filling. Accessibility is provided by a series of manholes or vaults, each having an opening at ground level. Entrance and exit vaults reside at respective ends of the subduct. Access vaults are placed at spaced locations intermediate the entrance and exit vaults.

The several access vaults divide the subduct into plurality of segments. Each segment has an entrance or upstream end at one vault and an exit or downstream end at the subsequent vault. A pull line extends through the subduct. A slack length of the pull line, commonly incorporated into the subduct prior to burial, is available within each vault.

The signal transmission cable is pulled through the subduct by the pull line. The cable is supplied by a spool thereof placed near the entrance vault. The upstream end of the pull line and the cable, in sequence, are drawn through the subduct. The operation is completed when the downstream end of the transmission cable is received within the exit vault and the pull line is stowed, usually upon a take-up spool.

It is desirable that cable be installed in continuous runs of maximal length. Splicing is a laborious, expensive and time consuming task. Additionally, each splice adversely effects transmission quality. The foregoing is substantially more pronounced in fiber optic cable than in wire cable. Further limitations, restricting the length of a single pull, are the result of the inherent tensile weakness of fiber optic cable. Accordingly, the prior art has devised various techniques for pulling extended lengths of transmission cable, especially fiber optic cable.

In accordance with one scheme, the installation is accomplished by a sequence of pulls and stores. Initially, cable is pulled from a supply spool through the first segment of the subduct and stored at the first access vault. Subsequently, the cable is pulled through the second segment and stored at the second access vault. The process is repeated in sequence temporarily storing cable at each access vault and subsequently pulling the cable through the adjacent downstream segment.

More recently, the art has provided means and methods for simultaneously pulling a cable through at least two adjacent segments of a subduct. The pull line is wound about the capstan wheel of a winch placed in the exit vault and in each access vault. The several capstan wheels are simultaneously driven by individual hydraulic motors, each powered by hydraulic fluid of pre-set maximum pressure. Tension exerted by a downstream winch pulls the cable into frictional driving engagement with the rotating wheel of the adjacent upstream winch.

Although providing certain advantages over previous efforts, the multiple winch system described above is not considered to be a panacea. Initially it is noted that set-up is laborious and time consuming, requiring that each winch be lowered into a vault and frequently requiring partial disassembly and reassembly. Further, since the capstan wheel is driven by a motor which responds to a predetermined fluid pressure system it is possible that excessive tension can be exerted upon the cable. Also the system requires the constant observation of a workman for adjusting and controlling each winch. Other shortcomings are noted.

In an airborne scheme, the cable is suspended between supporting members such as poles. Typically, a support cable is already present, and the more delicate signal transmission cable is secured thereto. First, however, the transmission cable must be pulled along the support cable. Conventionally this has been accomplished by attaching one end of a pull line to an end of the transmission cable, and attaching the other end of the pull line to a pull vehicle such as a truck or the basket of a boom truck. The pull cable is generally run through pulleys coupled to the support cable. Additional pulleys are added as the cable is pulled off its storage spool. This is a very simple and effective method of stringing cable for short distances, but, as discussed above for subterranean cable work, it is desirable that cable be installed in continuous runs of maximal length. Splicing is a laborious, expensive and time consuming task. Additionally, each splice adversely effects transmission quality. The length of a single pull is limited by the inherent tensile weakness of transmission cable, and especially limited by fiber optic cable. When that limit is reached, the cable must be collected such as on a take up spool, and a new run begun. This can be a tedious, time consuming procedure, and very difficult to implement if a pull truck is used.

Another problem which arises from using a vehicle to pull a cable, is subjecting the cable to a tension force in excess of a recommended value. A large pull vehicle can greatly exceed the tensile strength of a fiber optics cable, damaging the cable before the operator is even aware there is a problem. This has been overcome to some extent by the use of tensometers coupled between the pull vehicle and a cable. Typically the tensometer is coupled to a display within the cab of the vehicle and shows the tension on the cable as it is pulled. When the tension reaches a predetermined level, the vehicle operator stops pulling. This works well when the operator is paying close attention to the display as he drives, and if he can stop the vehicle at any time along the route of the cable run. Generally, however, the operator cannot stop in certain spots, for example on railroad tracks, intersections or the like. Therefore, the operator must stop where he can, before he exceeds the recommended tension. Furthermore, if a snag develops while pulling the cable, the recommended tension can be greatly exceeded before the operator can react to the warnings from the display, even if he is paying close attention.

It would be highly advantageous, therefore, to remedy the foregoing and other deficiencies inherent in the prior art.

Accordingly, it is an object of the present invention to provide improvements in the installation of signal transmission cable.

Another object of the invention is the provision of improvements especially adapted for the installation of fiber optic cable in a subduct.

And another object of the invention is to provide an improved cable pulling system which operates in response to actual cable tension.

Still another object of the instant invention is the provision of improved means whereby an upstream pulling means is actuated and regulated in response to a downstream pulling means.

Yet another object of the invention is to provide means for regulating the speed of operation of an upstream pulling means in response to the speed at which a cable is pulled by a downstream pulling means.

Yet still another object of this invention is the provision of means for monitoring the upstream stress upon a cable and maintaining the stress below a predetermined value.

And a further object of the invention is to provide a system which is self-regulating and does not require constant observation and control by a workman.

Still another object of the immediate invention is the provision of an integrated system including various ancillary functions such as lubricating the cable and taking-up the expended pull line which function at a rate proportional to a rate at which the cable is pulled.

Yet a further object of the invention is to provide a cable pulling system that can be emplaced and made operational with comparative convenience and ease.

And yet another object of the invention is the provision of improvements according to the above which are relatively unencumbered and inexpensively practiced.

And another object of the present invention is to provide an apparatus for use on pull vehicles, to prevent exceeding a predetermined tension placed on a cable being pulled.

SUMMARY OF THE INVENTION

Briefly, to achieve the desired objects of the instant invention in accordance with a preferred embodiment thereof, provided is a primary device and a relay device which cooperate as an apparatus for pulling a cable through a duct having a downstream end, an upstream end, and an access point intermediate the ends dividing the duct into a first segment adjacent the upstream end and a second segment adjacent the downstream end. The primary device exerts a first pulling tension upon the cable to pull the cable at a pulling speed from the downstream end of the duct. The relay device is responsive to the pulling speed of the primary device for exerting a second pulling tension upon the cable to pull the cable at a relay speed from a downstream end of the first segment and for availing the cable to the upstream end of the second segment.

More specifically, the relay device includes first means for pulling the cable from the downstream end of the first segment and relaying the cable from to the upstream end of the second segment and second means for controllably varying the first means to move the cable at a relay speed which is variable and proportionate to the pulling speed imposed by the primary device. The second means is responsive to a differential between the pulling speed and the relay speed to control the first means to pull the cable at a relay speed which is in equilibrium with the pulling speed. Equilibrium is achieved by causing the first means to accelerate when the pulling speed exceeds the relay speed and to decelerate when the pulling speed is lesser than the relay speed.

In accordance with a preferred embodiment thereof, the relay device includes cable handling means for exerting the second pulling tension upon the cable and variable drive means for driving the cable handling means to move the cable at the relay speed. Further included are cable sensing means responsive to a differential between the pulling speed and the relay speed and control means responsive to the cable speed sensing means for varying the speed of said drive means to achieve equilibrium between the pulling speed and the relay speed. The cable sensing means is moveable in a first direction in response to the pulling speed being greater than the relay speed and in a second direction in response to the pulling speed being less than the relay speed. The control means increases the speed of the drive means in response to the sensing means moving in the first direction and decreases the speed of the drive means in response to the sensing means moving in the second direction. Biasing means normally urge the sensing means in the second direction.

Further, in accordance with a preferred embodiment thereof, the primary device and the secondary device include means for limiting the respective pulling tensions to a predetermined value. Preferably, there are provided first means for monitoring tension exerted upon the cable by the cable handling means and second means for controlling operative response of the cable handling means to the drive means, the second means being responsive to the first means whereby the tension exerted upon the cable is maintained below a predetermined value. A preferred first means includes a moveable member for receiving the cable thereagainst and biased against movement by a force of predetermined value. The member is urged to move in response to the tension upon the cable exceeding the predetermined value. In response to movement of the moveable member, the second means moderates operative response of the cable handling means to the drive means. A preferred second means includes control means for controlling the motive energy supplied to a motor for driving the cable handling means. The force opposing movement of the moveable member may be variably adjustable to a selected predetermined value.

The apparatus of the instant invention may also include a pusher device for pulling the cable from a supply reel thereof and feeding the cable to the upstream end of the duct. Tension exerted upon the cable by the pusher device is substantially less than the pulling tension of either the primary device or the relay device. Also provided are means for driving a take up reel to receive excess cable from the primary device at a tension which is less than the pulling tension exerted by the primary device. Further provided are means for lubricating the cable at a quantitative rate which is proportional to the speed of movement of the cable through the duct. A preferred lubricating means includes a fitting for receiving the cable therethrough prior to entry into the duct and a pump for supplying lubricant to the fitting from a reservoir thereof. The pump is driven by a motor which resides in series with the cable handling means and the drive means to operate at a proportional speed.

In accordance with a more specific embodiment of the invention, especially adapted for use in connection with an underground installation, the primary device is positioned adjacent an access vault and the relay device is positioned adjacent an access vault. Preferably, each device includes a frame for supporting the cable handling means upon the respective vault. First guide means are provided for receiving the cable from the respective duct segment and guiding the cable to the respective cable handling means. The relay device further includes second guide means for receiving the cable from the cable handling means and guiding the cable to the adjacent downstream duct segment.

In accordance with yet another feature of a cable pulling system of the present invention, provided is a drive out controller apparatus for use with a pulling vehicle to prevent subjecting a cable to a tension force greater than a predetermined value. The apparatus includes a tension relief mechanism mountable on the vehicle, and having a locked state and an unlocked state, a tensometer engaging said pull line for gauging the tension placed thereon, and generating a signal indicating a tension force value and a control system for switching said tension relief mechanism to said unlocked state upon receiving a signal from said tensometer indicating a predetermined tension value has been reached.

More specifically, the tension relief mechanism includes a spool rotatably mountable on said pulling vehicle, said spool rotatable by a pulling force generated by pulling said cable, a stop mechanism coupled to said spool for preventing rotation of said spool with said tension relief mechanism in said locked state and permitting rotation of said spool with said spool in said unlocked state and a brake coupled to said spool for subjecting said spool to a drag in the unlocked state.

Stop mechanism includes a pin movable between an extended position in which said pin engages said spool, preventing rotation thereof, and a retracted position in which said pin disengages said spool, allowing rotation thereof, and a motor for moving said pin between said extended position and said retracted position, said motor actuated by said control system. The brake adjustably engages said spool for increasing and decreasing the amount of said pulling force required to rotate said spool.

BRIEF DESCRIPTION OF THE DRAWINGS

The foregoing and further and more specific objects and the advantages of the instant invention will become readily apparent to those skilled in the art from the following detailed description of preferred embodiments thereof taken in conjunction with the drawings, in which:

FIG. 1 is a semi-schematic elevational view of a cable pulling apparatus constructed in accordance with the teachings of the instant invention as it would appear during use for installing a cable in a subduct system, portions of the illustration being broken away and in section;

FIG. 2 is an enlarged fragmentary frontal perspective view of the intermediate device seen in connection with the apparatus of FIG. 1;

FIG. 3 is an enlarged side elevational view of the upper portion of the device seen in FIG. 2;

FIG. 4 is an enlarged fragmentary rear perspective view of the device seen in FIG. 2;

FIG. 5 is an enlarged front elevational view of the device of FIG. 2, portions thereof being broken away for purposes of illustration;

FIG. 6 is a fragmentary elevational view generally corresponding to the lower portion of the view of FIG. 5 and showing an alternate embodiment thereof;

FIG. 7 is a partial perspective view of a winding and storage apparatus useful in connection with the invention seen in FIG. 1;

FIG. 8 is a partial perspective view of an alternate winding and storage apparatus;

FIG. 14 is a perspective view of a drive out controller being used on a pull vehicle stringing cable in an airborne situation;

FIG. 15 is an enlarged perspective view of a tension relief mechanism and tension sensing means in broken away relation;

FIG. 16 is a perspective view illustrating an alternate embodiment of tension sensing means in broken away relationship with control means;

FIG. 17 is a perspective view of another embodiment of a portion of a drive out controller, illustrating a tension relief mechanism and tension sensing means;

FIG. 18 is a perspective view illustrating a relay unit employed to assist in stringing an airborne cable;

DETAILED DESCRIPTION OF THE PREFERRED EMBODIMENTS

Figure 9:
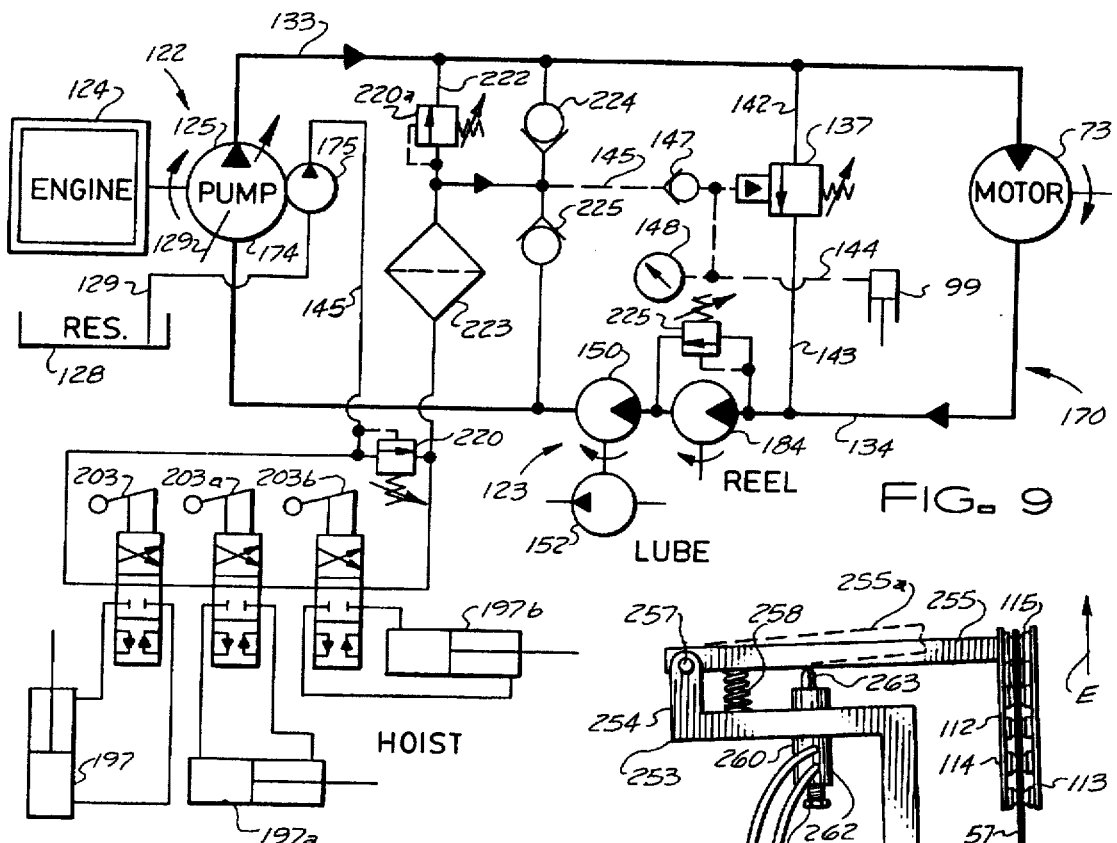
FIG. 9 is a schematic illustration of a control system used in the operation of the apparatus of FIG. 1.

Turning now to the drawings in which like reference characters indicate corresponding elements throughout the several views, attention is first directed to FIG. 1 which illustrates facilities of the type commonly prepared for installation of a signal transmission cable in connection with an underground or subterranean system. Seen is an entrance vault 20, an exit vault 22 and an intermediate access vault 23. Residing within an excavation, entrance vault 20 is defined by continuous upright side wall 24 terminating with an upper open end 25 residing at approximately ground level as designated by the reference character 27. Similarly constructed and placed, exit vault 23 includes sidewall 28 with open top 29 and access vault 23 includes sidewall 30 with open upper end 32.

Subduct 33, a conduit generally fabricated of a plastic material such as polyethylene, communicates between entrance vault 20 and exit vault 22, having inlet end 34 projecting through sidewall 24 and outlet end 35 projecting through sidewall 28. Not extending continuously through access vault 23, subduct 33 is divided into a first segment 37 extending between entrance vault 20 and access vault 23, and a second segment 38 extending between access vault 23 and exit vault 22. Outlet end 39 of first segment 37 and inlet end 40 of second segment 38 penetrate sidewall 30.

For purposes of illustration, a single representative access vault is shown intermediate the entrance vault and the exit vault. In actual practice, the installation may include several access vaults. The spacing and number of access vaults are dependent upon numerous factors including the total length of the installation, the type of cable being installed, the type of subduct and contour of the terrain. Ideally, the overall length of the installation coincides with the length of cable carried upon a supply spool. It is also noted that the illustrated installation may comprise a single section of a substantially longer installation in which the exit vault subsequently becomes the entrance vault as seen with reference to the continuation of the subduct 33a projecting through the sidewall 28 of exit vault 22.

The foregoing is set forth for purposes of orientation and reference in connection with the ensuing detailed description of preferred embodiments of the instant invention. The structure described is intended to be typically representative of subterranean signal transmission cable systems in general. Further and more specific details, as well as analogous structures, will be readily apparent to those skilled in the art.

With continued reference to FIG. 1 there is seen, in semi-schematic representation, apparatus constructed in accordance with the teachings of the instant invention for installing signal transmission cable in the above described subterranean installation. Provided by the instant invention is a primary unit, a relay unit and a pusher unit generally designated by the reference characters 50, 52 and 53, respectively. Primary unit 50 functions in cooperation with exit vault 22 while pusher unit 53 is positioned adjacent entrance vault 20. A relay unit 52 is associated with each access vault 23. The units cooperate to pull signal transmission cable through subduct 33.

Conventionally, the signal transmission cable 54 is provided by a supply reel 55. A pull line 57, also referred to as a pulling tape, extends through subduct 33, having been previously placed in accordance with various procedures as will be readily apparent to those skilled in the art. Further, in accordance with prior art practice, the end of pull line 57 projecting from inlet end 34 of subduct 33 is secured to the end of cable 54 extending from reel 55 to form a continuous elongate member. The units of the instant invention cooperate to pull the elongate member, pull line 57 and subsequently signal transmission cable 54, through subduct 33. As the operation proceeds, excess or used pull line 57 is wound and stored upon take-up reel 58. The instant apparatus is especially sensitive to the more fragile types of signal transmission cable such as fiber optic cable.

The several units of the instant invention cooperate to pull the elongate member through subduct 33 in a direction indicated by the arrowed line A. For purposes of orientation and reference, arrowed line A is assumed to be pointing in a downstream direction. Accordingly, the inlet end of the subduct and of each segment thereof is considered to be the upstream end. Similarly, the outlet end of the subduct end of each segment thereof is considered to be the downstream end.

Briefly, pusher unit 53 pulls cable 54 from supply reel 55 and feeds the cable to the first segment 37 of subduct 33. Primary unit 50 initially draws or pulls pull line 57 from the second segment 38 of subduct 33 to be received by the take-up reel 58. Relay unit 52 draws the elongate member, initially pull line 57 and subsequently cable 54, from segment 37 and feeds the member thus pulled to second segment 38. A complete understanding of each unit and the interaction therebetween as an integrated cable pulling apparatus will be had with regard to the description which follows.

For reasons of simplicity and economy relating to manufacture and to operation, primary unit 50 and relay unit 52 share numerous common elements. An understanding of both units can be had with reference to a description of relay unit 52, which will now be made in detail.

Referring to FIG. 2, it is seen that relay unit 52 is a duplex structure having a cable handling unit generally designated by the reference character 60 and a power unit generally designated by the reference character 62. Cable handling unit 60, as further seen in FIGS. 3 and 4, includes a frame 63 having a pair of spaced apart, preferably parallel ground support members which are of sufficient length to span and bear upon the upper end 32 of access vault 23. A lifting bracket 67, preferably an inverted U-shaped member which alternately functions as a hand grip or attachment means for mechanized lifting equipment, is secured approximate each end of the support members 64 and 65. A transverse member 68 extends between support members 64 and 65, having respective ends thereof affixed to an intermediate point of the member 64 and 65. An upright support member 69 extends upwardly inward from ground support member 64. A mirror image upright support member 70 extends upwardly inward from ground support member 65. Cylindrical member 72 is affixed to the upper ends of upright support members 69 and 70. Preferably, frame 63 is fabricated as a weldment of metallic elements especially incorporating tubular members.

Cylindrical member 72 functions as a housing or support bracket for rotary motor 73 having forwardly extending drive shaft 74. In accordance with the immediately preferred embodiment of the invention, motor 73 is of the conventional hydraulic type which includes inlet port 75 and outlet port 77 adapted for the attachment of the customary hydraulic fluid lines. Capstan wheel 80, having rim 82 carried by hub 83, is affixed in driving engagement to drive shaft 74 of motor 73. In accordance with conventional practice, concave circumferential surface 84 extends about rim 82. Preferably, the axis of motor 73 and consequently the axis of rotation of capstan wheel 80, as represented by the broken line B, is angularly disposed to the horizontal, as defined by support member 64 and 56, to extend upwardly forward. Further description of the port 75 and 77 associated with motor 73 and of the angular disposition of axis B will be made presently.

Additional attention is now directed to FIG. 5 which shows an infeed cable guide and an outfeed cable guide designated by the reference characters 85 and 87, respectively, depending from frame 63 to reside within vault 23. Being analogously constructed and placed in mirror image arrangement, each guide includes a pair of spaced apart side plates 88 and 89 having a plurality of concave rollers rotatably supported therebetween. Preferably each cable guide 85 and 87 is quadrantal for guiding the cable through a turn of 90'.

Bracket 92 residing at an intermediate location along transverse member 68, supports depending support member 93 the lower end of which is pivotally affixed to the lower ends of cable guides 85 and 87 by pin 94. It is preferred that depending support member 93 extends along an upright axis represented by the broken line C which intercepts the axis of rotation B of capstan wheel 80. It is also preferred that depending support member 93 is selectively adjustable at elevated and lower positions as represented by the double arrowed line D. Similarly, a second depending support member 95 having a lower end thereof pivotally secured to the upper end of outfeed cable guide 87 by pin 97 is adjustably carried by a second bracket 98 which is also affixed to transverse member 68.

In accordance with the immediately preferred embodiment of the invention, the upper end of infeed cable guide 85 is secured to transverse member 68 by means of a hydraulic piston and cylinder assembly 99. Preferably, cylinder 99 is securable to transverse member 68 at selectively adjustable vertical positions as also represented by the double arrowed line D. The free end of operating rod 100, depending from the piston within the cylinder 99 is secured to the upper end of cable guide 85 by pin 102. Accordingly, with base 63 resting upon end 32 of sidewall 30, cable guides 85 and 87 are adjustably positionable whereby the lower ends are in substantial tangential alignment with subduct 33. It is noted that the upper end of each cable guide is in substantial tangential alignment with the circumferential surface 84 of capstan wheel 80.

Upper support member 105 includes upright portion 107 extending upwardly from cylindrical member 72 and bifurcated terminal portion 108. Terminal portion 108 is angularly disposed to portion 107 to extend upwardly rearward therefrom. Arm 109 extends forwardly from upper support member 105 at a location spaced above capstan wheel 80. At the rearward end, arm 109 is received within bifurcated portion 108 and pivotally secured thereto by pin 110. Intermediate cable guide 112 is carried at the forward end of arm 109. Being generally analogous to the previously described cable guides, intermediate cable guide 112 includes a pair of arcuate side plates 113 and 114 having a plurality of concave rollers 115 rotatably supported therebetween. Preferably, intermediate cable guide 112 extends through an arc of approximately 180' whereby the ends are in substantial tangential alignment with the surface 84 of capstans wheel 80. It is also preferred that intermediate cable guide 112 is substantially aligned with the forward portion of surface 84. Spring 117, in compression between arm 109 and flange 118 projecting from support member 105, biases arm 109 and intermediate cable guide 112 in an upward direction as indicated by the arrowed line E. Adjusting screw 119 changes the effective length of spring 117 in accordance with conventional practice as will be readily appreciated by those skilled in the art.

Power unit 62 is best described with reference to FIG. 2 which shows base 120 upon which is supported drive unit 122 and lubrication unit 123. Drive unit 122, as further illustrated in FIG. 4, includes internal combustion engine 124 having fluid pump 125 secured thereto in driving engagement. Fuel for internal combustion engine 124 is contained within tank 127 while reserve hydraulic fluid is contained within reservoir 128, both of which are supported upon base 120. Although other forms of power producing units are perceived by the instant invention, an internal combustion engine is preferred for reasons of versatility and self-containment as best adapted for use in remote areas.

Fluid pump 125 is of the conventional commercially available type having selectively variable pressure and volume output. Exemplary is the unit distributed by Oil Gear Company and designated Hydura Pump, Model No. PVW-06. Output of pump 125 is controlled by control lever 129 which is movable in directions indicated by the double arrowed arcuate line F. For purposes of illustration, control lever 129 is shown at an intermediate position. In response to movement in a direction toward engine 122, output of pump 125 is increased while, conversely, output is decreased in response to movement of lever 129 in direction away from engine 122. At the extreme of movement in the decreasing direction, output from unit 125 is ceased. At the extreme of movement in the increasing direction maximum output is achieved. A preferred exemplary maximum output is a pressure of approximately 2,000 pounds per square inch with a flow rate of approximately 11 gallons per minute. For purposes of reference, it is seen that pump 125 includes outlet port 130 and inlet port 132.

Hydraulic motor 73 is of the conventional commercially available type. A recommended exemplary motor is the one designated as WSI Model 360 Gear reducer distributed by Von Ruden Manufacturing Company. Supply or high pressure line 133 communicates between outlet port 130 of pump 125 and inlet port 75 of motor 73. Return or low pressure line 134 communicates between outlet port 77 of motor 73 and inlet port 132 of pump 125. Accordingly, capstan wheel 80 is driven at a rotational speed and torque responsive to pump 125.

Control cable 135, a conventional commercially available product, has respective ends thereof secured to arm 109 and control lever 129 in accordance with conventional procedures known to those skilled in the art. Accordingly, control lever 129 is movable in response to movement of intermediate cable guide 112. Intermediate cable guide 112 is reciprocally moveable in directions indicated by the double arrowed line G. In response to the biasing of spring 117, intermediate cable guide 112 is normally held in the full up direction, as previously indicated by the arrowed line E. In response thereto control lever 129 is moved to the extreme of the decreasing direction in which the output of pump 125 is curtailed. As intermediate cable guide 112 moves downwardly, in the direction indicated by the arrowed line H, the output of pump 125 is continuously increased. From the foregoing detailed description, it is apparent that movement of capstan wheel 80 is variable between idle and a rotation of predetermined maximum speed and torque.

It is preferred, as seen with particular reference to FIG. 5, that a pilot operated shuttle valve 137 be placed in parallel with supply line 133 and return line 134. The pressure at which valve 137 opens is selectively variable by adjustment screw 138. An exemplary valve cartridge for the immediate purpose is the device distributed by Oil Gear Company under the designation HSU 1200. For this purpose, tee fitting 139 is placed in series with supply line 133 and tee fitting 140 is placed in series with return line 134. Lines 142 and 143 communicate between the tee fittings 139 and 140, respectively, and throughout shuttle valve 137.

Pressure line 144 communicates between hydraulic cylinder assembly 99 and shuttle valve 137. Accordingly, valve 137 is responsive to pressure within cylinder assembly 99. To ensure that line 144 is filled with hydraulic fluid and that the piston is extended within the cylinder assembly 99, hydraulic fluid is fed into line 144 from any readily available source, such as a charge pump associated with pump 125, through feed line 145. One-way check valve 147, in series with line 145, ensures that pressure in line 144 as a result of pressure exerted upon hydraulic cylinder assembly 99 is relayed to valve 137 and is not returned to feed line 145. Pressure gauge 148 provides a visual indication of pressure within line 144. Cross or four-way fitting 149 provides common attachment for valve 137, pressure line 144, feed line 145 and pressure gauge 148.

Referring again to FIG. 2, it is observed that lubrication unit 123 includes rotary hydraulic motor 150 placed in series with return line 134 and drivingly engaged with fluid pump 152 for drawing lubricating fluid from reservoir 153 and discharging the fluid through lubrication line 154. Lubricating fluid passing through lubrication line 154 is discharged into fitting 155 through which pull line 57 and cable 54 pass prior to entry into subduct segment 38. Preferably, one end of fitting 155 is provided with a socket in the form of a counterbore for receiving the inlet end of subduct segment 38. Being placed in series with supply line 133, pump 150 is caused to run at a speed proportionate to the rotation of capstan wheel 80. Accordingly, lubrication is supplied to fitting 155 at a proportionate flow rate. Further control over the speed of pump 150, and the rate of flow of the lubricating fluid, is exercised by altering the ratio of the pulley and belt drive between pump motor 150 and pump 152.

The foregoing detailed description of relay unit 52 includes various elements which are common to primary unit 50. Especially noted are frame 63, capstan wheel 80, motor 73, drive unit 122, infeed cable guide 85 and the pressure responsive elements including hydraulic cylinder assembly 99 and relief valve 137 communicating between infeed cable guide 85 and drive unit 122. Peculiar to relay unit 52 are outfeed cable guide 87, intermediate cable guide 112 and lubrication unit 123. An appreciation of the differences between primary unit 50 and relay unit 52 is readily had with the understanding that primary unit 50 functions only to pull the cable while relay unit 52 additionally relays cable to a downstream unit.

An alternate arrangement for suspending infeed cable guide 85 below frame 63 is illustrated in FIG. 6. The immediate embodiment of the invention includes bracket 160 affixed to transverse member 68 for the purpose of attachment of depending support member 162. Analogous to the arrangement between depending support member 93 and bracket 92, depending support member 162 is adjustable to selectively position bracket 160 in directions indicated by the double arrowed line L. Pin 163 pivotally connects the upper end of infeed cable guide 85 to the lower end of support member 162. Previously described hydraulic cylinder assembly 99 is pivotally affixed to the lower end of infeed cable guide 85 by pin 164. Rod 100a, an elongated rod 100, extending from assembly 99, terminates with foot 165 bearing against sidewall 30 of access vault 23. Support cable 167, extending between transverse member 68 and the lower end of infeed cable 85, prevents sag and holds the lower end of infeed cable guide in position during set up.

Cylinder assembly 99 placed as seen in FIG. 6 or placed as seen in FIG. 5 serves the same function. In the embodiment of FIG. 5, cylinder 99 is responsive to force in the direction of arrowed line J. While placed in the arrangement seen in FIG. 6, hydraulic cylinder 99 is responsive to force in a direction indicated by the arrowed line K. As will be appreciated by those skilled in the art, both are the same force measured at a different location.

Various means, including prior art apparatus, are known for operating take-up reel 58 for winding and storing pull line 57. Provided by the instant invention is an improved winding and storage apparatus as seen in FIG. 7 and generally designated by the reference character 170. Adapted to be mounted upon and transported by a motor vehicle, such as a truck, utility unit 170 includes base 172 supporting upright frame 173. Carried upon base 172, in common with previously described power unit 62, is a drive unit 122 including internal combustion engine 124 and hydraulic pump 125 having volume control 129. As seen in greater detail in FIG. 9, pump 125 is a duplex device including system pump 174 and charge pump 175. As previously described, system pump 174 supplies pressurized hydraulic fluid through supply line 133 for rotation of motor 73 and receives expended fluid through return line 134. As will be appreciated by those skilled in the art, charge pump 175 draws hydraulic fluid from reservoir 128 through make-up line 129 to supply system pump 174 with hydraulic fluid to compensate for any losses thereof within the system. It will also be appreciated that charge pump 175 may be used to supply hydraulic fluid to feed line 145 for supplying hydraulic piston and cylinder assembly 99 as previously described.

In accordance with the immediately preferred embodiment of the invention, pump 125 is under the immediate control of an operator. For this purpose there is provided operating rod 177 having an end engaged with control lever 129 and terminating at the other end with hand knob 178. At an intermediate location, operating rod 177 is slidably supported by guide 179 for movement in directions indicated by the double arrowed line L. In response to movement of operating rod 177 as indicated by the double arrowed line L, operating lever 129 is caused to move in corresponding directions previously indicated by the arcuate double arrowed line F. The immediate hand controlled drive unit is especially devised for use in combination with primary unit 50 whereby the primary unit 50 and each relay unit 52 is under control of a single operator as will be described in further detail presently.

Take-up reel 58 is drivingly engaged with axially extending axle shaft 180. A terminal portion of axle shaft 180 extends outboard of either side of reel 58. Two pairs of rollers 182 and 183, supported by frame 173 on respective sides of reel 58 removably receive and rotatably support respective terminal portions of shaft 180. Motor 184 rotates shaft 180 and hence take-up reel 58 through a conventional belt and pulley arrangement 185. The normal direction of rotation of reel 58 during take-up is indicated by the arcuate arrowed line designated by the reference character M. Being driven by the low pressure or return line 134, motor 184 rotates reel 58 at a speed which is proportionate to the rotation of motor 73 but with substantially less torque. Accordingly, the stress or tension exerted on pull line 57 intermediate primary unit 50 and take-up reel 58 is substantially less than the stress exerted upon either pull line 57 or cable 54 intermediate primary unit 50 and the adjacent relay unit 52.

Further included in utility unit 170 is a hoist unit, generally designated by the reference character 190, supported by pedestal 192 upstanding from base 172. Column 193 supported by pedestal 192 extends upwardly therefrom and is journaled for rotation about the longitudinal axis represented by the broken line N. Collar 194 having lug 210 extending therefrom is drivingly engaged with column 193. Double acting linear hydraulic motor 197, a conventional commercially available device, includes cylinder 198 having free end 207 pivotally secured to frame 173. Operating rod 200 extending from cylinder 198 terminates with clevis 202 pivotally affixed to lug 210. Operating rod 200 is caused to move in reciprocal directions, extendable and retractable relative cylinder 198, in response to pressurized hydraulic fluid from line 145. The direction of flow of the hydraulic fluid and hence the direction of movement of rod 200 is determined by manually operable control valve 203. Accordingly, column 193 is reciprocally rotatable about axis N in directions indicated by the double arrowed arcuate line O.

A pair of spaced apart ears 204 project from column 193. Although only one ear 204 is illustrated it is to be understood that a second ear 204 extends from column 193 in spaced parallel relationship. Boom 205 includes a free end 207 and a fixed end 208 received between ears 204 and pivotally secured thereto by pin 209. Lug 210 projects from boom 205 at a location intermediate the ends thereof. Arm 212 terminates with upwardly projected bifurcated portion 213. A second double acting linear hydraulic motor 197a extends between column 193 and boom 205. The free end 207 of cylinder 198 is received within and pivotally affixed to bifurcated terminal portion 213 of arm 212. Clevis 202 carried at the free end of operating rod 200 receives and is pivotally connected to lug 210. Supplied with pressurized hydraulic fluid from line 145 through a second manually operable control valve 203a, hydraulic motor 197a functions to pivotally raise and lower boom 204 in directions indicated by the double arrowed arcuate line designated P.

A third double acting linear hydraulic motor 197b includes cylinder 198 having end 199 pivotally secured to boom 205. Double grooved sheave 214 is rotatably affixed to the free end of operating rod 200. A second double grooved sheave 215 is rotatably secured proximate the free end 207 of boom 205. A cable 217 terminating at the free end with hook 218 is secured about the sheaves 214 and 215 in accordance with conventional block and tackle practice. Hydraulic motor 197b is manually operated by control valve 203b. In response thereto, hook 218 is raised and lowered as indicated by the double arrowed line designated Q. Hoist unit 190, of which further description will be made presently, is of sufficient strength to lift the previously noted units designated by the reference characters 50, 52 and 53.

Referring more specifically to FIG. 9. it is noted that pump 125 and the several elements associated along the circuit defined by supply line 133 and return line 134 are considered to comprise the main drive system. Pump 175, line 145 and the elements serviced thereby are designated as the auxiliary system. The pressure of the hydraulic fluid supplied to the valves 203 is monitored and regulated by pressure relief valve 220. Fluid circulating through the auxiliary system passes through filter 223 and is returned to the main system, i.e. lines 133 and 134, through check valves 224 and 225. Pressure within the auxiliary system is monitored by a second pressure relief valve 22a which returns fluid to the main system, i.e. line 133, through line 222. Also noted is check valve 225 installed in line 134 in parallel with motor 184.

FIG. 8 illustrates alternate means for rotating reel 58. Seen is arm 230 pivotally connected at the fixed end 232 to bifurcated bracket 233 by pin 234. Although not specifically illustrated but as will be readily appreciated, bracket 233 is secured to base 172 of utility unit 170. Rotary hydraulic motor 184a is supported at the free end 235 of arm 230. Wheel 237 covered with friction enhancing material 238 is drivingly carried by shaft 239 of motor 184a. Tension spring 240, having one end engaged with arm 230 and another end appropriately secured to base 172, biases arm 123 downwardly in the direction indicated by the arrowed line R.

In accordance with the immediately preferred embodiment of the invention, motor 184a replaces motor 184 and may be substituted therefore in the schematic diagram of FIG. 9. Motor 184a drives wheel 237 to rotate in the direction indicated by the arcuate arrowed line S. Accordingly, take-up reel 58 is rotated in a direction indicated by the arrowed line M. In response to the rotation of take-up reel 58, cable 57 is drawn in the direction indicated by the arrowed line T and wound about take-up reel 58. Wheel 237 is in frictional driving engagement with cable 57 with a force predetermined by tension spring 240. Accordingly wheel 237 will slip should the speed of the incoming cable decrease or stop. It is also noted that the speed at which line 57 is taken up remains constant regardless of the constantly increasing diameter of the reel as a result of the cable wound upon reel 58.

The immediate embodiment of the instant invention also contemplates means for evenly winding cable 57 upon take-up reel 58. With further reference to FIG. 8 there is seen a double lead screw 242 rotatably journaled in pillow blocks 243 which are in turn supported by frame 172. Follower 244 having guide pins 245 extending upwardly therefrom for receiving cable 57 therebetween, is drivingly engaged with lead screw 242. Conventional belt and pulley arrangement 247 drivingly couples lead screw 242 with take-up reel 58.

Lead screw 242 and follower 244 cooperate in a manner analogous to the conventional familiar device commonly referred to as a level wind mechanism. In response to rotation of screw 242, follower 244 moves reciprocally between the ends of screw 242 as represented by the double arrowed line U. Cable 57 being guided by pins 245 passes back and forth across take-up reel 58 concurrently with being wound. Accordingly, cable 57 is placed in even coiled layers about take-up reel 58.

Figure 10:
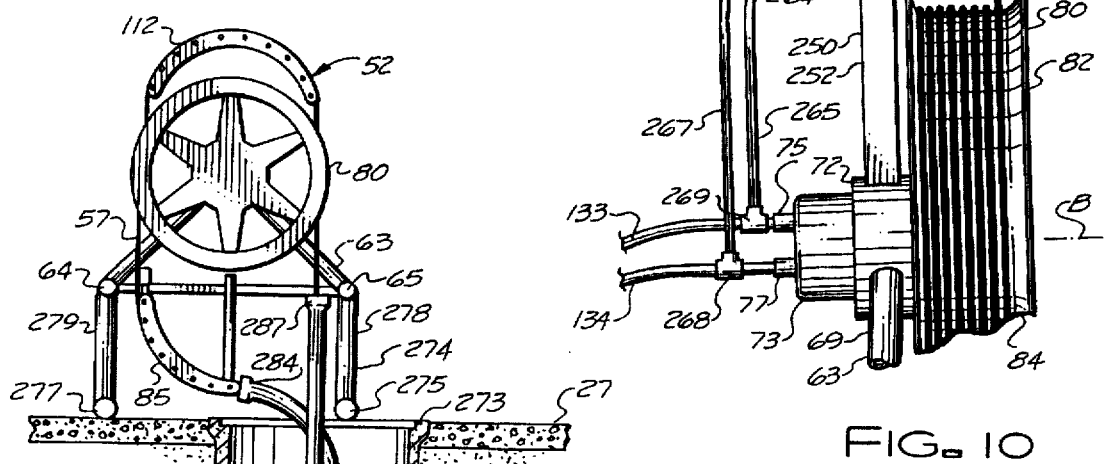
FIG. 10 is a view generally corresponding to the view of FIG. 3 and illustrating an alternate embodiment thereof.

FIG. 10 illustrates alternate means for utilizing intermediate cable guide 112 to control capstan wheel 80. In general similarity to the previously described embodiment, the instant embodiment includes an upper support member 250 extending upwardly from cylindrical member 72 and including upright portion 252 and rearwardly extending portion 253. Bifurcated portion 254 upstanding from rearwardly extending portion 253 receives the rearward end of arm 255 and is pivotally secured thereto by pin 257. Intermediate cable guide 112 is carried at the forward end of arm 255. Compression spring 258, having respective ends bearing against rearwardly extending portion 253 and arm 255, biases arm 255 and intermediate cable guide 112 upwardly in the direction of arrowed line E as represented by the broken partial outline designated 255a.

In accordance with the immediately preferred embodiment of the invention, there is provided a variable pressure relief valve 260 having body 262 carried by rearwardly extending portion 253 of upper support member 250 and plunger 263 bearing against arm 255. Valve 260 is selectively variable by means of adjustment screw 264. Valve 260 is placed in parallel with the hydraulic fluid supply to motor 73 by virtue of auxiliary lines 265 and 267. Line 265 communicates between valve 260 and tee fitting 269 installed in supply line 133. Auxiliary line 267 communicates between valve 260 and tee fitting 268 installed in return line 134.

When intermediate cable guide 112 is in the fully elevated position, in the direction of arrowed line E, arm 255 is spaced from plunger 263. Allowing valve 260 to function as a normal relief valve. At contact between arm 255 and plunger 263, control lever 129 is in the maximum increasing direction. In response to further movement of arm 255, plunger 263 is depressed opening valve 260, thereby reducing the driving force to capstan wheel 80.

Figure 11:
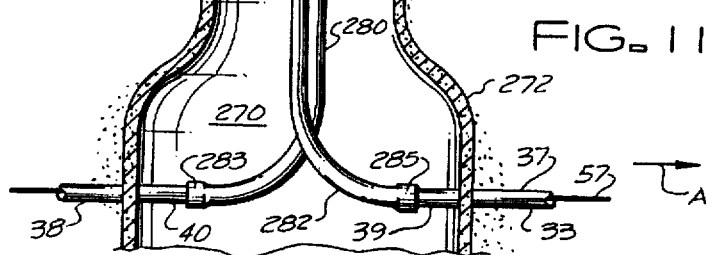
FIG. 11 is a view generally corresponding to the illustration of FIG. 5 and showing an alternate embodiment thereof.

The typical subterranean signal transmission cable system illustrated in FIG. 1 includes vaults normally of a size for receiving that portion of the units of the instant invention depending below the frame. Facilities including vaults having a substantially smaller opening are also known. FIG. 11 illustrates a portion of such a system including vault 270 defined by sidewall 272 having relatively small open top 273. In all other respects, the system is analogous to the previously described system.

For use with vaults of the type illustrated, there is provided a sub-frame 274 having ground support members 275 and 277 from which extend upright support members 278 and 279, respectively. The normal ground support members 64 and 65 of frame 63 are supported by sub-frame 274 at an elevation whereby infeed cable guide 85 resides above ground level 27. It is noted that in the immediate embodiment outfeed cable guide 87 has been removed. It is also noted that, for purposes of illustration, the cable is being pulled in a direction counter to the direction in FIG. 1 as indicated by the arrowed line A.

Further provided by the instant embodiment are infeed guide tube 280 and outfeed guide tube 282 which communicate between subduct 33 and relay unit 52. Infeed guide tube 280 is also used in connection with primary unit 50. Infeed guide tube 280 includes an enlarged inlet end 283 which is received over the end 40 of subduct segment 38. Outlet end 284 of infeed guide tube 280 receives the lower end of infeed cable guide. A low friction and abrasion resistant material, infeed cable tube 280 guides the cable from segment 38 to infeed cable guide 85. Similarly, outfeed cable guide tube 282 includes an enlarged end 285 for receiving end 39 of subduct segment 37 and bell mouthed inlet end 287 for receiving cable 57 from capstan wheel 80. The functioning of unit 52, as previously described, remains unchanged.

Referring again to FIG. 1, it is seen that pusher unit 53 includes frame 292 supporting internal combustion engine 122 drivingly engaged with hydraulic pump 125 as previously described. Cable feed unit 293 is also supported by frame 292.

Cable feed unit 293 includes first drive motor 294 and first idler 295 about which extends first drive belt 297. Further included is second drive motor 298, second idler 299 and second belt 300. Motors 294 and 298 are driven by pump 125 through high pressure supply line 302 and return line 303. Belts 297 and 300 frictionally receive cable 54 therebetween and are rotated by the respective motors to draw cable 54 from reel 55 in a direction indicated by the arrowed line S. Guide tube 304 conveys cable 54 from cable feed unit 293 to the inlet end of subduct 33.

The foregoing described units cooperate as an integrated apparatus for installing a signal transmission cable in a previously prepared subterranean facility. The function of the several units and the interaction therebetween will now be described in detail.

The several units, primary unit 50, relay unit 52 and pusher unit 53, along with supply reel 55 and take-up reel 58 are transported to the site of the subterranean facility by any convenient means, especially one or more motorized vehicles such as trucks. For ease of transportation and to prevent damage, it is recommended that the portions of units 50 and 52 are disassembled and transported separately.

Especially noted is that portion, including infeed cable guide 85 and outfeed cable guide 87, depending below frame 63. The several power units may also be transported separately.

Utility unit 170 is secured, preferably near an edge, of the bed of a selected vehicle. Hoist unit 190 is used to lift each of the units from the transport vehicle and position as graphically represented in FIG. 1. Supply reel 55 may be similarly positioned or, alternately, left aboard the transport vehicle. The vehicle carrying the utility unit 170 is then positioned downstream of the exit vault to locate the take-up reel 58.

It is within the scope of the instant invention that a hoist unit 190 be incorporated into the power unit 62 of the primary unit 50 and each relay unit 52. The pusher unit 53 may also include a hoist unit 190. Accordingly, each unit is self contained and may be transported upon a separate vehicle.

After each unit is positioned, the depending portion thereof and the power unit, as best illustrated in FIGS. 2, 4 and 5, is assembled. A fitting 155 is coupled with the inlet end of each segment of the subduct. After having the upstream end of the cable passed therethrough, guide tube 304 is positioned with the outlet end in communication with the respective fitting 155 and the inlet end communicating with pusher unit 53. At each access vault, the downstream terminal portion of pull line 57 extending from the upstream segment of the subduct is spliced to the upstream terminal portion extending from the upstream end of the respective downstream segment of the subduct. Similarly, the upstream end of pull line 57 is connected to the lead end of cable 54 from supply reel 55. Accordingly, the several sections of the pull line 57 and the signal transmission cable 54 are joined to form an elongate flexible member.

A substantial length of slack pull line 57 resides within each access vault 23 and within the exit vault 22. Working in a direction from the downstream end of the upstream subduct segment, i.e., end 39 of segment 37 as seen in FIG. 1, pull line 57 is passed over infeed guide 85 and wound in several coils about capstan wheel 80. The line is wound with an initial coil at the rearward or inboard edge of surface 84 with each successive coil being placed forwardly as best seen with reference to FIG. 3. After the coils are in place, the line is passed upwardly over intermediate cable guide 112 and then downwardly around outfeed cable guide 87. At the exit vault 28, the line is similarly passed over the respective infeed cable guide 85 and wound about the capstan wheel 80 of the primary unit 50. Finally, the downstream terminal portion of the line 57 is fixed to take-up reel 58. The apparatus is now readied for pulling the elongate flexible member, initially pull line 57 and subsequently signal transmission cable 54, through the subduct 33.

Initially, each shuttle valve 137 is adjusted to a selected setting to provide relief at a maximum pulling force as predetermined by the tensile strength of the signal transmission cable. Each intermediate cable guide 112 is oriented, by means of adjusting screw 119 altering the effective length of spring 117, to reside in the fully up position and compensate for weight, bending resistance and other factors associated with the flexible member as will be appreciated by those skilled in the art. Finally, with each control lever 129 moved to an initial position to curtail any output from the associated pump, the respective internal combustion engine 122 is started. The apparatus is now readied for pulling the elongate flexible member, initially pull line 57 and subsequently signal transmission cable 54, through the subduct 33. Slack in the downstream terminal portion of pull line 57 is now wound about take-up reel 58. This action also tightens the pull line about the capstan wheel 80 of primary unit 52 for frictional driving engagement. It is noted that the pull exerted by reel 58 is sufficient only for the purpose of taking up slack and is substantially below that required to rotate the capstan wheel of the primary unit to pull line from the subduct 33.

With relay unit 52 and pusher unit 53 standing at idle, rotation of capstan wheel 80 associated with primary unit 50 is initiated by movement of the respective control lever 129. Simultaneously, rotation of take up reel 58 is initiated. A sequence of events then follows. First, slack pull line 57 intermediate primary unit 50 and take up reel 58 is wound about take up reel 58. In response to continued rotation of take up reel 58, the coils of pull line 57 encircling capstan wheel 80 of primary unit 50 are tightened and brought into frictional driving engagement. Accordingly, primary unit 50 exerts a pulling tension upon pull line 57 to commence movement thereof. It is noted that the pull exerted by reel 58 is sufficient only for the purpose of taking up slack and is substantially below that required to rotate the capstan wheel of the primary unit to pull cable from the subduct.

Initially, primary unit 50 functions to pull slack cable within exit vault 28, more specifically intermediate capstan wheel 80 and the downstream end 35 of subduct segment 38. Next, cable 57 commences movement through subduct segment 38 taking up slack within access vault 23 intermediate the upstream end 40 of subduct segment 38 and the capstan wheel 80 of relay unit 52. As pull line 57 continues to move, it is brought into firm engagement with out feed cable guide 87 at intermediate cable guide 112. Subsequently the coils of pull line 57 are tightened into friction engagement with capstan wheel 80 of relay unit 52. In response to continued movement, as a result of the pulling tension exerted by primary unit 50, pull line 57 pulls intermediate cable guide 112 of relay unit 52 downwardly to move lever 27 and supply pressurized hydraulic fluid to motor 73 for rotation of capstans wheel 80. Should the installation and apparatus include additional upstream relay units 52, each will be operated in sequence in response to the adjacent downstream unit analogous to the above described response of relay unit 52 to primary unit 50. After all slack has been removed from the cable within entrance vault 20, pusher unit 53 is initiated to pull signal transmission cable 54 from supply reel 55.

Figure 12:
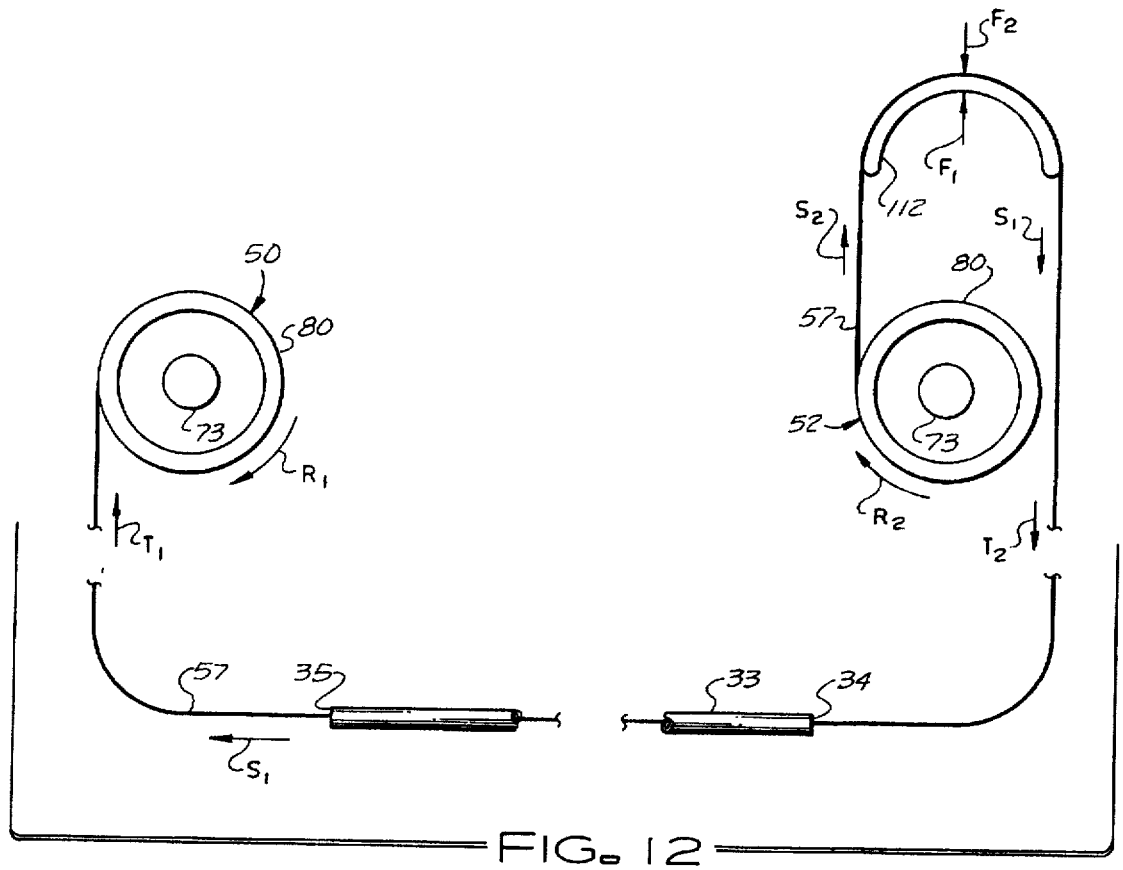
FIG. 12 is a diagrammatic illustration useful in explaining the operation of the cable pulling apparatus seen in FIG. 1.

It is apparent from the foregoing description that each relay unit 52 is responsive to the adjacent downstream pulling unit, either primary unit 50 or another relay unit 52. Communication between adjacent units is through the elongate flexible member. Each subsequent unit responds to pull and relay the elongate flexible member at a speed which is predetermined by the speed at which the member is pulled by the adjacent downstream unit. Referring more specifically to FIG. 12, there is seen, in diagrammatic representation, primary unit 50 and relay unit 52 having respective capstan wheels 80. Relay unit 52 further includes intermediate cable guide 112. Also illustrated is subduct 33 having inlet end 34 and outlet end 35. Pull line 57, the initial portion of the elongate flexible member, extends through subduct 33 and is engaged with each capstan wheel 80. After engagement with capstan wheel 80 of relay unit 52, pull line 57 extends over intermediate cable guide 112 enroute to be relayed to primary unit 50.

With regard to primary unit 50, motor 73 rotates capstan wheel 80 in a direction with predetermined velocity and force represented by the arcuate arrowed line designated $R_1$. Accordingly, a predetermined tension represented by the arrowed line $T_1$ is exerted upon pull line 57 to pull line 57 through subduct 33 at a speed, direction and rate of movement, as represented by the arrowed line designated $S_1$.

Motor 73 of relay unit 52 is capable of rotating the associated capstan wheel 80 in a direction with a speed and a force as represented by the arcuate arrowed line $R_2$. In response thereto pull line 57 is pulled from the preceding subduct segment and is supplied to intermediate cable guide 112 at a relay speed represented by the arrowed line $S_2$. It will be appreciated that pull line 57 leaving intermediate cable guide 112 moves at the previously described speed $S_1$. Tension on pull line 57 leaving intermediate cable guide 112 is represented by the arrowed line $T_2$. Tension $T_2$ is equal to the tension $T_1$ minus losses due to friction and other factors as pull line 57 moves through subduct 33. Intermediate cable guide 112 is held in equilibrium between the forces represented by the arrowed lines $F_1$ and $F_2$. Force $F_1$ is the result of the upward biasing of spring 117. Initially, force $F_2$ is the combined weight of arm 109, intermediate cable guide 112 and the static weight of a portion of pull line 57.

Figure 13:
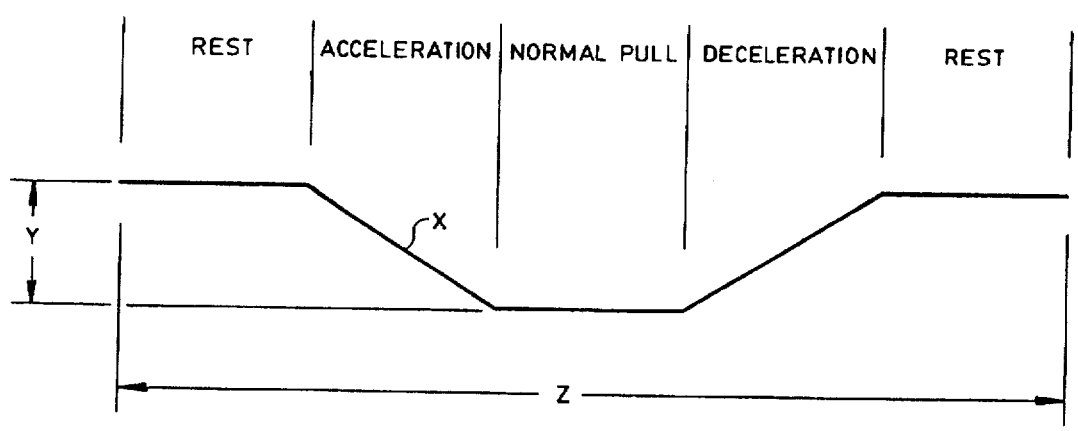
FIG. 13 is a diagrammatic view useful in explaining the self regulating speed operation of one of the units seen in FIG. 1.

For purposes of explanation, it can be considered that the primary unit 50 and the relay unit 52 cooperate through four phases of operation as diagrammatically represented in FIG. 13. The phases are rest, acceleration, normal pull and deceleration. The phases are related to the positioning of intermediate cable guide 112 as represented by the line X. For further orientation, line X is plotted against the movement of intermediate cable guide 112 represented by the double arrowed line designated Y and time extending in the direction indicated by the arrowed line Z.

During the phases of rest and normal pull, the apparatus is in the equilibrium. During the phases of acceleration and deceleration, the apparatus is not in equilibrium. It is the function of intermediate cable guide 112, to sense imbalance and bring the apparatus into equilibrium as will be now described.

During the initial rest phase, neither capstan wheel 80 is rotating. Accordingly, $R_1$, $R_2$, $T_1$, $T_2$, $S_1$ and $S_2$ have a value of zero.

The acceleration phase is initiated by supplying pressurized hydraulic fluid to motor 73 for rotation of capstan wheel 80 associated with primary unit 50. Accordingly, the values of $R_1$, $T_1$ and $S_1$ increase to a predetermined value. Initially, capstan wheel 80 associated with relay unit 52 remains at rest. Correspondingly, the value of $S_2$ is zero. Stated in other words, the value of $S_1$ exceeds the value of $S_2$. In response to continued movement of line 57 as represented by the arrowed line $S_1$, intermediate cable guide 112 is drawn downwardly against the biasing force $F_1$. Correspondingly, pressurized hydraulic fluid is supplied to motor 73 for rotation of capstan wheel 80 of relay unit 52. The downward movement of intermediate cable guide 112 continues until the value of $S_2$ equals the value of $S_1$. It is apparent that at this point the value of $R_2$ equals the value of $R_1$. With all forces equalized, the apparatus is in equilibrium and precedes through the phase of normal pull.

When it is desired to cease operation, the supply of hydraulic fluid to motor 73 of primary unit 50 is curtailed to bring the associated capstan wheel 80 to a stop. Initially, the speed of pull line 57 represented by the arrowed line $S_1$ exceeds the speed represented by the arrowed line $S_2$. Accordingly, intermediate cable guide 112 moves upwardly thereby decreasing the value of $R_2$ in proportion to the decrease in the value of $R_1$. The deceleration phase continues until the apparatus achieves the final rest phase in which the apparatus is again in equilibrium.

As will be appreciated by those skilled in the art, fluctuations in friction and other forces resisting the movement of pull line 57 through subduct 33 will result in fluctuations of the value of the movement speed of line 57 as represented by the arrowed line $S_1$. intermediate cable guide 112, responsive to the differential between the values of $S_1$ and $S_2$, will move accordingly to alter the speed of capstans wheel 80 associated with relay unit 52 as represented by the arcuate arrowed line $R_2$. It is apparent, therefore, that relay unit 52 is responsive to primary unit 50 through the communication provided by pull line 57. It is equally apparent that the response of relay unit 52 is dictated by the speed at which primary unit 50 pulls pull line 57. It is also noted that lubrication unit 123, being in series with motor 73, supplies lubricant to pull line 57 at a rate which is proportional to the speed of pull line 57 as represented by the arrowed line $S_1$.

Each unit, primary and relay, is also responsive to the stress on the incoming or immediate upstream segment of the flexible member. A relative force is exerted upon the infeed cable guide 85, which is received by the piston and cylinder assembly 99 and relayed to relief valve 137 which functions to controllably govern the operation of capstan wheel 80. The valve 137 curtails the flow of pressurized hydraulic fluid to motor 73 as necessary to maintain pulling stress or tension within the selected limit.

Turning now to FIG. 14 a system for stringing an airborne signal transmission cable 310 is illustrated. Air borne cable 310 is pulled from a supply spool 312 and supported by a support cable 313 generally spanning a plurality of poles 314, in accordance with conventional practice. Typically, a pull line 315 has an end 316 coupled to an end 317 of cable 310 as can be seen with additional reference to FIG. 15. Pull line 315 is then coupled to a pull vehicle 318. In the immediate embodiment, pull vehicle 318 is a boom truck having a basket 319 at the end of a boom 320 which may be raised to the level of support cable 313. As cable 310 is pulled from supply spool 312, an operator ensconced in basket 319 periodically attaches removable pulleys 322 which support signal transmission cable 310 from support cable 313. Pull line 315 and subsequently cable 310 are pulled along pulleys 322 in a direction indicated by arrowed line AA. Cable 310 may be pulled in this manner until either, cable 310 runs out, the distance to cover is spanned or the tension on the cable reaches a point where damage would occur with further pulling. It is at this point that a drive out controller system generally designated 325 is indispensable.

Referring specifically to FIG. 15, drive out controller system 325 includes a tension relief mechanism 327 coupled to pull vehicle 318, a tensometer 328 for sensing the tension forces sustained by cable 310 and control system 329 (with additional reference to FIG. 16) for receiving signals from tensometer 328 and controlling tension relief mechanism 327. Tension relief mechanism 327 may be coupled to the back of a pull vehicle, or coupled to basket 319 of the boom truck. Tension relief mechanism 327 includes a rotatable spool 330 supported by a clevis 332. Clevis 332 is securely mounted to pull vehicle 318 and rotatably carries spool 330, the rotation thereof subject to the influences of a stop mechanism 333 and a brake 334, also carried thereby. Brake 334, carried by clevis 332 adjacent spool 330, imparts a drag on the rotation of spool 330, the purpose of which will be addressed in the ensuing description of the operation of drive out controller system 325. Stop mechanism 333 may be any conventionally known apparatus for preventing rotation of spool 330 with respect to clevis 332, such as a ratchet and pawl, a brake having two positions, to completely stop spool 330 and to act as a drag (FIG. 17) or, as illustrated in FIG. 15, a pin 335 actuated by a motor 337, mounted on clevis 332. Pin 335 is movable by motor 337 between an extended position in which it engages and prevents rotation of spool 330, and a retracted position in which it allows rotation of spool 330 upon receipt of a signal from control system 329.

Still referring to FIG. 15, pull line 315 coupled to end 317 of cable 310, extends over pulleys 322 along support cable 313, passes through tensometer 328, and is coupled to spool 330. For proper operation of drive out controller system 325, an excess of pull line 315 is carried by spool 330 in anticipation of use during the pulling process. In this embodiment, tensometer 328 is fixed to vehicle 318 proximate tension relief mechanism 327 with pull line 315 extending therethrough to tension relief mechanism 327. Various configurations have been contemplated, including coupling tension relief mechanism 327 to vehicle 318 and tensometer 328 to basket 319, or both to vehicle 318. Tensometer 328 is illustrated as being what is commonly referred to as a running line tensometer. This refers to its characteristic of allowing the line to run freely through three rotating wheels 338 while sensing tension on cable 310. It is this characteristic which permits it to be fixed to vehicle 318. The importance of this aspect will be discussed subsequently.

Those skilled in the art will realize that substantially any tensometer or like device may be employed, for example, tensometer 328 may be replaced with a tensometer 340 as illustrated with additional reference to FIG. 16. Tensometer 340 is free from vehicle 318 and couples end 317 of cable 310 to end 316 of pull line 315. This type of tensometer is fixed in relation to its position on cable 310, therefore it cannot be attached to vehicle 318 in this embodiment. A control cable 342 with a quick release coupler 343 couples tensometer 340 to control system 329. Control system 329 preferably includes a display and control unit 344 which receives and decodes signals from the tensometers. Control system 329 may also include a permanent recorder 345 which will print out a hard copy of the tension forces generated. Display and control unit 344 provides information to the operator of vehicle 318 in various manners such as by a gauge, digital readout or the like for imparting information to the operator in a visually manner, and/or audio signals such as bells, whistles, beeps or the like. Display and control units are well known in the art, and any may be employed. Control system 329 is in communication with, and upon receipt of a predetermined tension force sends a signal to stop mechanism 333 of tension relief mechanism 327 (FIG. 15).

It will be understood that FIG. 16 is intended to represent the replacement of tensometer 328 with tensometer 340 within drive out controller system 325, other elements remaining substantially unchanged unless specifically addressed. While FIG. 15 alone illustrates tension relief mechanism 327, it is intended that pull line 315 and control unit 344 of FIG. 16 are also coupled to tension relief mechanism 327 although not specifically illustrated. Furthermore, while FIG. 16 illustrates control system 329, it is intended that tension relief mechanism 327 and tensometer 328 are also coupled to control system although not specifically illustrated. In other words, FIGS. 15 and 16 together illustrate substantially the entirety of drive out controller system 325, differing only in replacement of the tensometers.

During operation, tension relief mechanism 327 is in a locked state wherein stop mechanism 333 engages spool 330 preventing rotation thereof as vehicle 318 pulls cable 310 from supply spool 312, stringing it along support cable 313. As cable 310 is pulled, tensometer 328 or 340 measures the tension on cable 310. Signals from tensometer 328 or 340 are communicated with control system 329. This provides the vehicle operator with information on the tension forces being applied to cable 310. Preferably two tension force values are determined prior to pulling and programmed into control system 329. Control system 329 preferably further includes a security system, such as a mechanical combination on display and controller unit 344, or a requirement for a password built into the software thereof, to prevent the tension values from being changed without appropriate authorization. The first tension value is the lower, and is comparable to a caution zone. The second tension value is the value not to be exceeded. Upon receiving a signal from tensometer 328 or 340 that the first tension value has been reached, control system 329 signals the operator for caution. At this point the operator realizes he is coming to the pull limit, or a snag is developing. He may elect to stop at that point or continue. Upon reaching the second value, control system 329 switches tension relief mechanism to an unlocked state by sending a signal to motor 337 of stop mechanism 333 causing pin 335 to be retracted, and allowing spool 330 to rotate under the pull force. Rotation of spool 330 allows the tension to diminish as pull line 315 is spooled off of spool 330. Brake 334 produces a drag on spool 330 to prevent free rotation thereof which would result in cable 310 stripping pull line 315 off spool 330 by its weight, and sagging between poles 314. This is undesirable for numerous reasons including producing a hazard such as by sagging over a roadway.

The release of spool 330 prevents a suddenly developed snag from damaging cable 310. Before the operator can react, control system 329 will switch tension relief mechanism 327 to the unlocked state releasing spool 330 and reducing tension. The operator may then stop and correct the problem. In another scenario, the operator has reached the critical tension, but cannot stop for some reason. He may proceed for a distance, until the pull line carried by spool 330 is gone. This should give him plenty of time or distance.

Referring back specifically to FIG. 15, it can now be fully appreciated that the free movement of pull line 315 through tensometer 328 allows tensometer 328 to be fixed to vehicle 318. Upon release of spool 330, pull line 315 will move through tensometer 328. The same occurrence when tensometer 340 is used (FIG. 16), requires that quick release coupler 343 couple control cable 342 to tensometer 340. Upon release of spool 330, tensometer 340 will move away from vehicle 318 with cable 310 as pull line 315 unspools. If control cable 342 cannot break away from tensometer 340, either or both may be damaged.

Turning now to FIG. 17, a further embodiment of a drive out controller system generally designated 350 is illustrated. In this embodiment, a tension release mechanism 352 including a spool 353 rotatably carried within a clevis 354, is coupled to a pull vehicle 355 by a tensometer 357 generally similar to tensometer 340. Spool 353 is prevented from rotating by a stop mechanism which, in this embodiment, is included in a brake 358. In this embodiment, brake 358 has two function. It prevents rotation of spool 353 until a signal is received from control system (not shown) as described previously in connection with FIGS. 15 and 16, then it opens, releasing spool 353 and providing a drag on the rotation of spool 353. While brake 358 is used in this embodiment to act both as a stop and a drag, it will be understood that the previously described elements may also be used.

While the drive out control system prevents exceeding a predetermined tension on a cable, it does not allow a longer cable run. A substantially longer cable run can be achieved by employing relay unit 52 as described previously. Relay unit 52 may be positioned on the ground and include a brace 360 engaging a pole 362 to provide additional stability. However it is not intended that the positioning of relay unit 52 be limited to this approach. A cable 363 would be pulled to its limit, then extended from a pulley 364 to capstan wheel 80. Cable 363 would engage relay unit 52 in substantially the same manner as described previously in connection with subterranean pulling, except that cable 363 would extend downward from pulley 364 instead of upward from access vault 23. Cable 363 can then be pulled by a vehicle for another run, assisted by relay unit 52 in the same manner as described previously. Additional relay units may be used as the run progresses.

Figure 19:
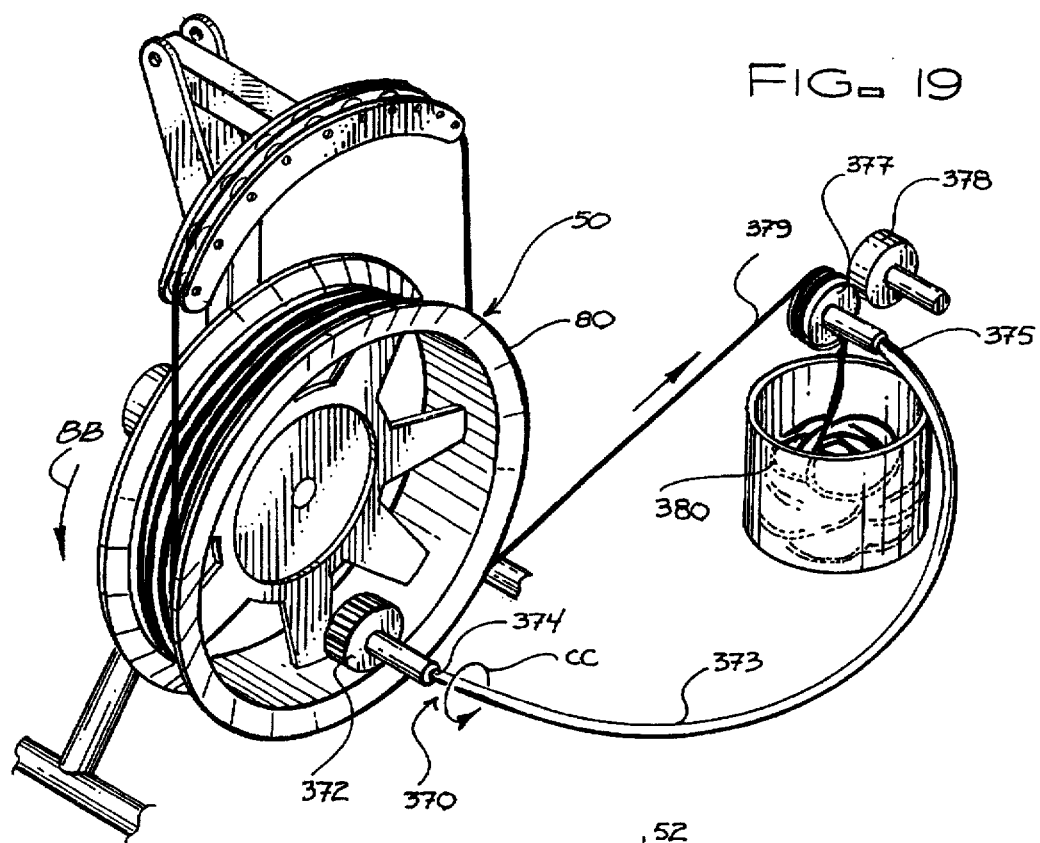
FIG. 19 is a perspective view of a friction drive accessory for use in combination with a relay unit for taking up the expended pull line.
Figure 20:
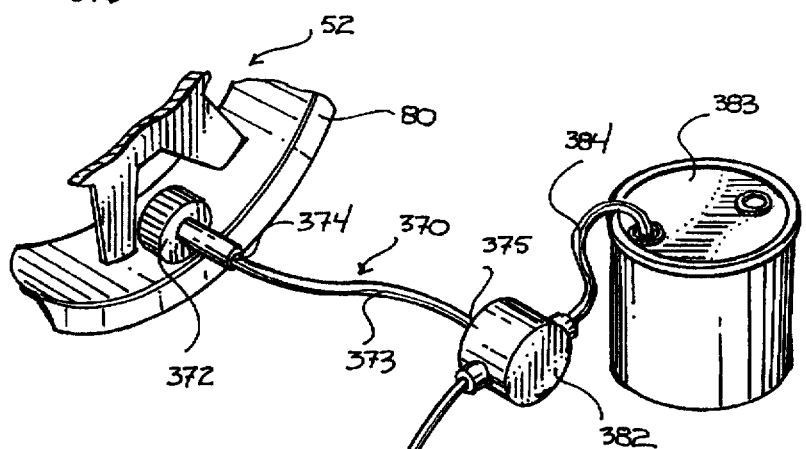
FIG. 20 is a perspective view of a friction drive accessory for use in combination with a relay unit for driving a pump to supply lubricant to said cable being pulled in a subterranean scheme.

To provide a motive force proportional to the rotation of capstan wheel 80 of relay unit 52 or primary unit 50, a driving device generally designated 370 is employed as illustrated in FIGS. 19 and 20. Driving device 370 includes a drive gear 372 engaging the inner surface of capstan wheel 80. As capstan wheel 80 rotates, drive gear 372 is rotated proportionally. An end 374 of a flexible drive shaft 373 is coupled to drive gear 372 and as capstan wheel 80 rotates in a direction indicated by arcuate arrowed line BB, drive gear 372 and flexible drive shaft 373 are rotated in a direction indicated by arcuate arrowed line CC. An opposing end 375 of drive shaft 373 may be coupled to various driven devices to accomplish different tasks.

Referring specifically to FIG. 19 primary unit 50 is illustrated. Opposing end 375 of drive shaft 373 is coupled to a driven wheel 377, which rotates at the same rate as drive gear 372. A clamp wheel 378 is positioned adjacent driven wheel 377 with a space therebetween for receiving a pull line 379. Driven wheel 377 and clamp wheel 378 receive pull line 379 from capstan wheel 80 therebetween, and spool it neatly into a container 380 at a rate identical to the rotation of capstan wheel 80. Using the rotation of capstan wheel 80 to drive driving device 370 ensures that collection of pull line 379 progresses at a rate compatible with capstan wheel 80. Furthermore, the collection of pull line 379 between driven wheel 377 and clamping wheel 378 provides the necessary friction coupling of pull line 379 on capstan wheel 80 for its proper operation.

Referring specifically to FIG. 20, capstan wheel 80 of either relay unit 52 or primary unit 50 is illustrated. Opposing end 375 of drive shaft 373 is coupled to a rotary pump 382. Rotation of drive shaft 373 cranks pump 382 which can be used to pump lubricant from a container 383 via a hose 384, to fitting 155 of subduct 33 via lubrication line 154, previously illustrated in FIG. 2. Pump 382, operated by driving device 370, replaces the complicated lubricating unit 122 illustrated in FIG. 2. Furthermore, the lubricant will be pumped at a rate proportional to the rotation of capstan wheel 80.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In a relay device for pulling cable and for relaying said cable to a subsequent device, said subsequent device capable of exerting a pulling tension upon said cable, for moving said cable at a first speed, and said relay device including cable handling means driven by a drive means for exerting a pulling tension upon said cable for moving said cable at a second speed, improvements therein for controlling said relay device in response to said subsequent device, said improvements comprising:

a) a first means response to said first speed and to said second speed; and b) second means responsive to said first means for controllably varying said cable handling means to accelerate said cable from said second speed when said first speed is greater than said second speed, and to decelerate said cable from said second speed when said first speed is lesser than said second speed to maintain equilibrium with said first speed.

2. The improvements of claim 1, wherein:

a) said first means is movable in response to a differential between said first speed and said second speed; and b) said second means controllably varies said cable handling means to accelerate or decelerate the cable in response to movement of said first means.

3. The apparatus of claim 2, wherein:

said first means is movable in a first direction in response to said first speed being greater than said second speed whereby said cable is accelerated from said second speed, and movable in a second direction in response to said first speed being lesser than said second speed whereby said cable is decelerated from said second speed.

4. The apparatus of claim 3, further including biasing means normally urging said first means in said first direction.

5. The improvements of claim 1, wherein said drive means includes a motor for driving said cable handling means and a source of power for supplying motive energy to said motor, and said second means includes:

control means for varying the motive energy supplied to said motor.

6. The apparatus of claim 1, wherein said second means includes a member for receiving said cable thereagainst and residing intermediate the cable handling means of said relay device and said subsequent device.

7. The apparatus of claim 6 wherein:

a) said member is movable in response to a differential between said first speed and said second speed; and b) said second means controllably varies said cable handling means to accelerate or decelerate the cable in response to movement of said member.

8. The apparatus of claim 7, wherein:

said member is movable in a first direction in response to said first speed being greater than said second speed whereby said cable is accelerated from said second speed, and movable in a second direction in response to said first speed being lesser than said second speed whereby said cable is decelerated from said second speed.

9. The apparatus of claim 8, further including biasing means normally urging said member in said first direction.

* * * * *